(12) United States Patent
McColloch

(10) Patent No.: US 9,002,168 B2
(45) Date of Patent: Apr. 7, 2015

(54) CLEAVE HOLDER, AN ASSEMBLY, AND METHODS FOR CLEAVING ENDS OF OPTICAL FIBERS AND SECURING THEM TO A MULTI-OPTICAL FIBER CONNECTOR MODULE

(71) Applicant: Avago Technologies General IP (Singapore) Pte. Ltd., Singapore (SG)

(72) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 32 days.

(21) Appl. No.: 13/621,588

(22) Filed: Sep. 17, 2012

(65) Prior Publication Data
US 2014/0079357 A1  Mar. 20, 2014

(51) Int. Cl.
G02B 6/00 (2006.01)
G02B 6/25 (2006.01)
G02B 6/38 (2006.01)

(52) U.S. Cl.
CPC ............... *G02B 6/3839* (2013.01); *G02B 6/25* (2013.01); *G02B 6/3865* (2013.01); *Y10T 29/49826* (2015.01)

(58) Field of Classification Search
CPC .. G02B 6/4255; G02B 6/4257; G02B 6/3636; G02B 6/3652; G02B 6/3838; G02B 6/3873; G02B 6/3881; G02B 6/4243
USPC .......................................................... 385/137
See application file for complete search history.

(56) References Cited

U.S. PATENT DOCUMENTS

| | | | |
|---|---|---|---|
| 5,216,741 A * | 6/1993 | Blijleven et al. | 385/137 |
| 5,501,385 A * | 3/1996 | Halpin | 225/96 |
| 5,892,870 A | 4/1999 | Fingler et al. | |
| 5,907,651 A | 5/1999 | Bunin et al. | |
| 5,909,528 A * | 6/1999 | Tamekuni et al. | 385/137 |
| 5,923,803 A * | 7/1999 | Bunin et al. | 385/80 |
| 5,946,986 A * | 9/1999 | Dodge et al. | 81/9.51 |
| 6,085,003 A | 7/2000 | Knight | |
| 6,585,421 B1 * | 7/2003 | Barnes et al. | 385/53 |
| 6,594,436 B2 | 7/2003 | Sun et al. | |

(Continued)

FOREIGN PATENT DOCUMENTS

| | | |
|---|---|---|
| CN | 201796164 U | 4/2011 |
| JP | 2006010871 A | 1/2006 |

OTHER PUBLICATIONS

MTP Solutions for High Density Networks, 2010, p. 1-22, FireFab, United Kingdom.

(Continued)

*Primary Examiner* — Charlie Y Peng

(57) ABSTRACT

A cleave holder is provided that allows the ends of optical fibers to be precisely stripped and cleaved and then secured at precise locations in a multi-optical fiber connector module. The cleave holder is secured to length-wise portions of optical fibers that extend through the cleave holder. The cleave holder has reference holes formed in its lower surface that allow it to be mounted on a fixture having pins on it that mate with the reference holes. Once the ends of the fibers have been stripped and cleaved, the cleaved ends are secured to precise locations within a connector module. The cleave holder and the connector module form an assembly that can be used together, with the cleave holder acting as a mounting structure for the assembly and as a strain relief mechanism.

20 Claims, 17 Drawing Sheets

(56) References Cited

U.S. PATENT DOCUMENTS

| | | | |
|---|---|---|---|
| 6,722,791 B2 * | 4/2004 | Cheng et al. ............... 385/83 |
| 6,860,645 B2 | 3/2005 | Miller et al. |
| 6,918,703 B2 | 7/2005 | Chen et al. |
| 6,931,195 B2 | 8/2005 | Lemoff |
| 7,003,869 B2 | 2/2006 | Lutzen et al. |
| 7,197,224 B2 | 3/2007 | Rolston et al. |
| 7,220,065 B2 | 5/2007 | Han et al. |
| 7,280,733 B2 | 10/2007 | Larson et al. |
| 7,543,994 B2 | 6/2009 | McColloch |
| 7,553,091 B2 | 6/2009 | McColloch |
| 7,567,743 B1 * | 7/2009 | Erdman et al. ............... 385/134 |
| 7,794,156 B2 | 9/2010 | Wang et al. |
| 7,905,751 B1 | 3/2011 | Davis |
| 8,002,477 B2 | 8/2011 | Colgan et al. |
| 8,036,500 B2 | 10/2011 | McColloch |
| 8,414,200 B2 * | 4/2013 | Van Noten et al. ............ 385/97 |
| 2003/0123836 A1 * | 7/2003 | Fujisawa et al. ............ 385/137 |
| 2004/0071407 A1 * | 4/2004 | Vergeest ..................... 385/58 |
| 2005/0058422 A1 * | 3/2005 | Doss et al. ................. 385/137 |
| 2008/0095502 A1 * | 4/2008 | McColloch ................... 385/71 |
| 2008/0095506 A1 * | 4/2008 | McColloch ................... 385/89 |
| 2009/0124117 A1 * | 5/2009 | Schleith ..................... 439/475 |
| 2009/0154884 A1 * | 6/2009 | Chen et al. .................. 385/79 |
| 2010/0202735 A1 * | 8/2010 | Childers et al. .............. 385/53 |
| 2010/0220953 A1 | 9/2010 | Kewitsch et al. |
| 2011/0044590 A1 * | 2/2011 | Kachmar ..................... 385/83 |
| 2012/0145307 A1 * | 6/2012 | Margolin et al. .............. 156/72 |
| 2012/0213475 A1 * | 8/2012 | Selli et al. .................. 385/33 |

OTHER PUBLICATIONS

MTP Backplane Interconnect System (BMTP), p. 1, Molex.

\* cited by examiner

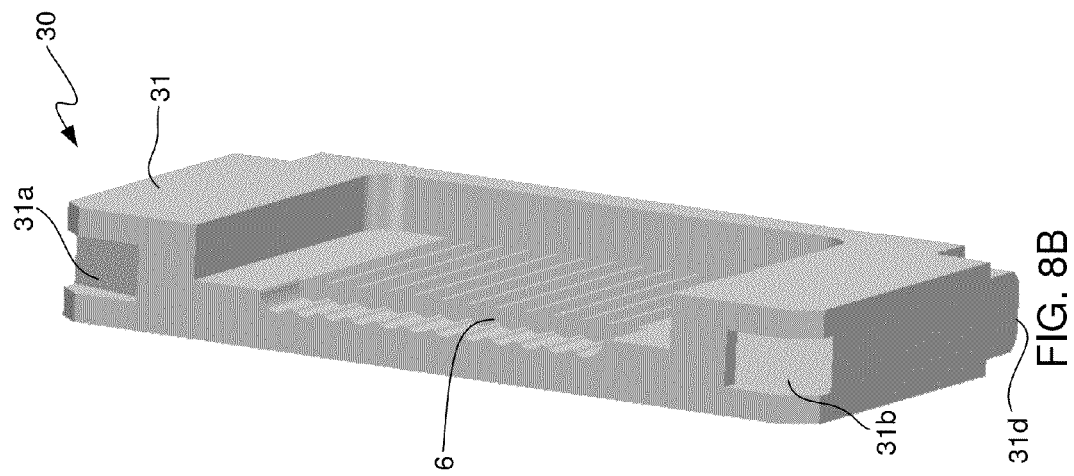
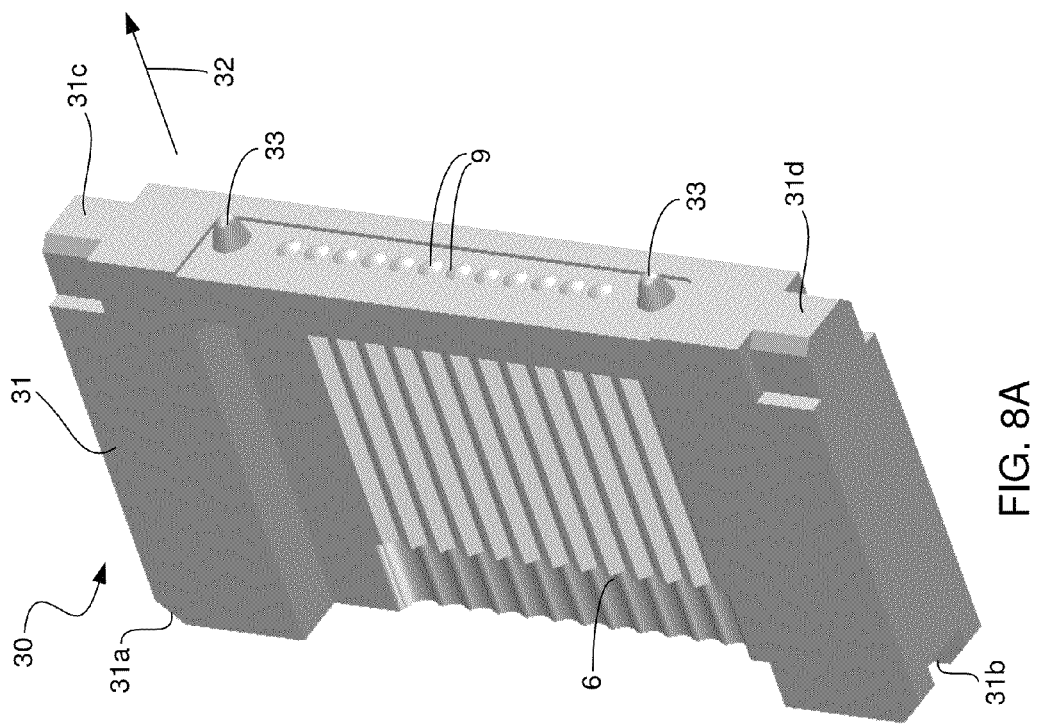

CLEAVE HOLDER, AN ASSEMBLY, AND METHODS FOR CLEAVING ENDS OF OPTICAL FIBERS AND SECURING THEM TO A MULTI-OPTICAL FIBER CONNECTOR MODULE

TECHNICAL FIELD OF THE INVENTION

The invention relates to optical communications. More particularly, the invention relates to a cleave holder, an assembly, and methods for cleaving ends of optical fibers and securing them to a multi-optical fiber connector module.

BACKGROUND OF THE INVENTION

Multi-optical fiber connector modules are used to mechanically couple the ends of a plurality of optical fibers to a parallel optical communications module that has a plurality of optical channels. The parallel optical communications module may be a parallel optical transceiver module having both transmit and receive optical channels, a parallel optical transmitter module having only transmit optical channels, or a parallel optical receiver module having only receive optical channels. A typical multi-optical fiber connector module includes an optics system that couples light between the ends of the optical fibers and respective optoelectronic devices that are contained within the parallel optical communications module. For transmit optical channels, the optoelectronic devices are electrical-to-optical converters such as laser diodes or light-emitting diodes (LEDs). For receive optical channels, the optoelectronic devices are optical-to-electrical converters such as photodiodes.

The multi-optical fiber connector modules and the parallel optical communications modules typically have mating features on them that allow the multi-optical fiber connector modules to be fixedly or removably mechanically coupled to one another. A variety of multi-optical fiber connector modules and parallel optical communications modules exist in the market today that are designed to mate with one another in a way that optically aligns the optical pathways between the ends of the optical fibers and the ends of the respective optoelectronic devices to enable optical data signals to be coupled between ends of the optical fibers and the respective optoelectronic devices. In designing and manufacturing the multi-optical fiber connector modules and the corresponding parallel optical communications modules, great care is taken to ensure that once the modules are mated together, very precise optical alignment exists along the optical pathways.

A variety of passive and active optical alignment techniques and tools are used today to provide the precise optical alignment that is needed to prevent unacceptable optical losses from occurring. Unacceptable optical losses lead to signal degradation, which can lead to an unacceptable bit error rate (BER). When the multi-optical fiber connector modules and the corresponding parallel optical communications modules are manufactured, the manufacturing tolerances typically must be extremely tight in order to ensure that very precise optical alignment exists along the optical pathways when the modules are mechanically coupled to one another in their ultimate relative positions and orientations. Otherwise, the optical alignment along the optical pathways will not have sufficient precision to prevent unacceptable optical losses from occurring.

Often times, the ends of the optical fibers are polished to form a flat optical surface on the end of the fiber. The flat optical surface improves the efficiency with which light is coupled into or out of the end of the fiber. The process of polishing the ends of the fibers is time consuming and expensive. An alternative to polishing the ends of the optical fibers is to cleave them and cover the cleaved ends in a refractive index-matching adhesive material, as disclosed in U.S. Pat. No. 7,543,994 (hereinafter the '994 patent) and U.S. Pat. No. 7,553,091 (hereinafter the '091 patent), which are assigned to the assignee of the present application and which are incorporated by reference herein in their entireties. The adhesive material has an index of refraction that matches, or nearly matches, the index of refraction of the fiber cores to prevent total internal reflection from occurring at the interface between the fiber ends and the optical elements of the optics system of the connector module. Leaving the ends of the fibers in as-cleaved condition eliminates the costs associated with polishing.

It can be difficult to strip and cleave fibers with precision, especially in cases where loose fibers are used instead of ribbons. Although tools exist for stripping and cleaving fibers, such tools are often not easy to use with precision. In addition, once the ends of the optical fibers have been stripped and cleaved, it can be difficult to secure them to a connector module at precise locations. A need exists for a way to easily strip and cleave fibers with precision and secure their ends to connector modules at precise locations within the connector modules.

SUMMARY OF THE INVENTION

The invention is directed to a cleave holder, an assembly, and methods. The cleave holder comprises a unitary body and a cover. The unitary body has a plurality of grooves formed in an upper surface thereof and has a plurality of reference holes formed in a lower surface thereof. The grooves hold length-wise portions of respective optical fibers that extend through the cleave holder. The cover is disposed on the unitary body such that a backside of the cover is in contact with the unitary body and with the length-wise portions of the optical fibers held in the grooves and serves to hold the length-wise portions of the optical fibers in fixed positions within the cleave holder.

The assembly comprises the cleave holder and a connector module. The connector module holds cleaved ends of the optical fibers that extend through the cleave holder in fixed, precise locations within the connector module.

One of the methods is a method of securing cleaved ends of a plurality of optical fibers to a connector module. The method comprises: providing a cleave holder having a plurality of grooves formed in an upper surface thereof and having a plurality of reference holes formed in a lower surface thereof; mounting the cleave holder on a fixture such that the reference holes formed in a body of the cleave holder mate with respective pins disposed on the fixture; disposing length-wise portions of respective optical fibers in the grooves; securing a cover of the cleave holder to the body of the cleave holder such that a backside of the cover is in contact with the body and with the length-wise portions of the optical fibers to hold the length-wise portions of the optical fibers in fixed positions within the cleave holder; providing a connector module; and securing cleaved ends of the optical fibers to fixed, precise locations within the connector module.

One of the methods is a method for holding a plurality of optical fibers to be stripped and cleaved. This method comprises providing the cleave holder; mounting a body of the cleave holder on a fixture such that reference holes formed in the body mate with respective pins disposed on the fixture; disposing length-wise portions of respective optical fibers in grooves formed in the body of the cleave holder; and securing a cover of the cleave holder to the body of the cleave holder such that a backside of the cover is in contact with the body and with the length-wise portions of the optical fibers disposed in the grooves to hold the length-wise portions of the optical fibers in fixed positions within the cleave holder.

These and other features and advantages of the invention will become apparent from the following description, drawings and claims.

BRIEF DESCRIPTION OF THE DRAWINGS

FIGS. 8A and 8B illustrate front and back perspective views, respectively, of a multi-optical fiber connector module in accordance with another illustrative embodiment.

DETAILED DESCRIPTION OF AN ILLUSTRATIVE EMBODIMENT

Figure 1:
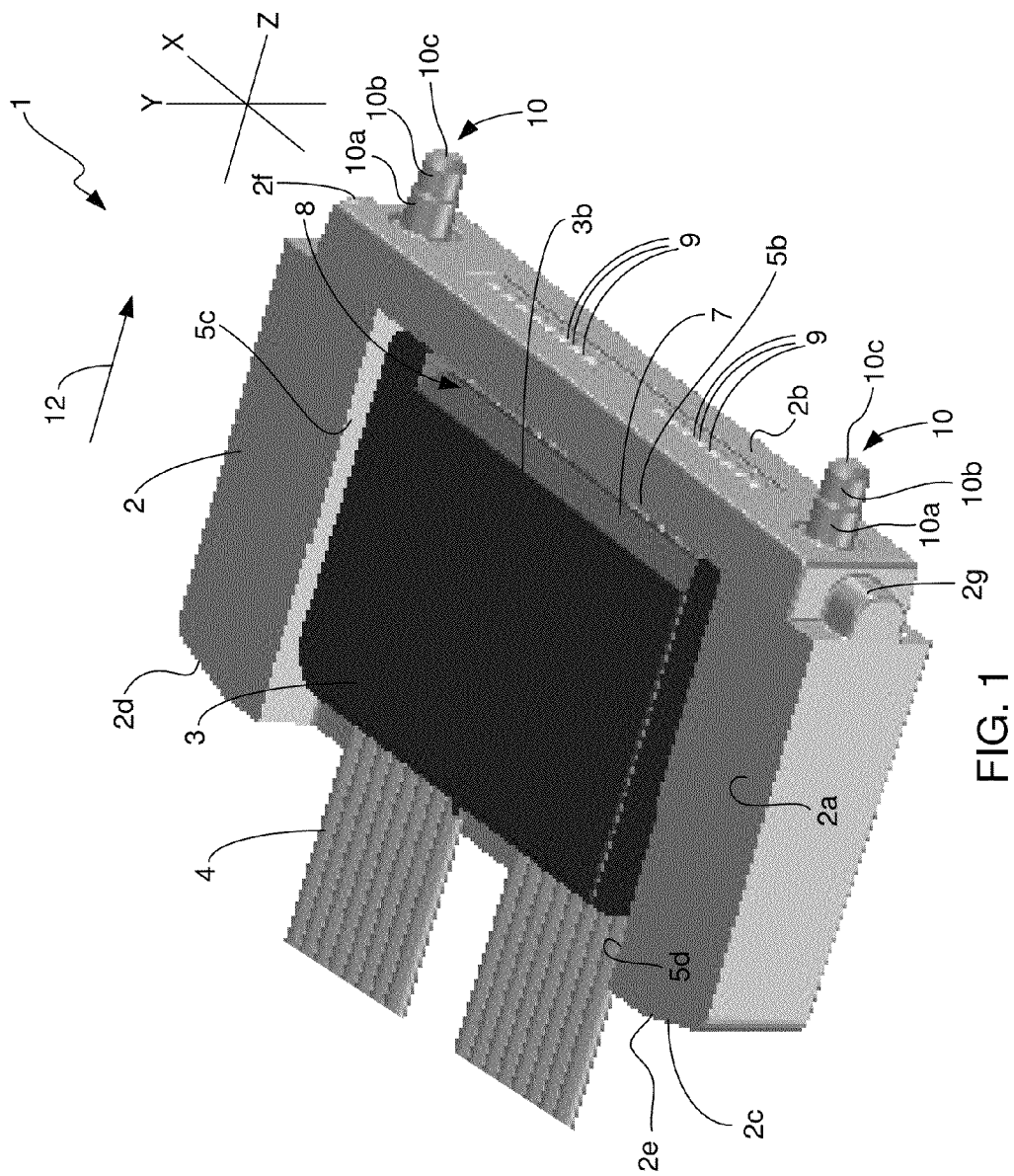
FIG. 1 illustrates a side perspective view of a multi-optical fiber connector module in accordance with an illustrative embodiment.

In accordance with embodiments of the invention, a cleave holder is provided that allows the ends of optical fibers to be precisely stripped and cleaved and then secured at precise locations in a multi-optical fiber connector module. Prior to describing the cleave holder and the methods and systems for stripping and cleaving fiber ends and securing them to a multi-fiber connector module, illustrative embodiments of a multi-fiber connector module with which the cleave holder may be suitable used will be described with reference to FIGS. 1-11B. Illustrative embodiments of the cleave holder and the methods and systems of the invention will then be described with reference to FIGS. 12-16. Like reference numbers in the figures represent like elements, features, or components. The features in the drawings are not necessarily drawn to scale.

Figure 2:
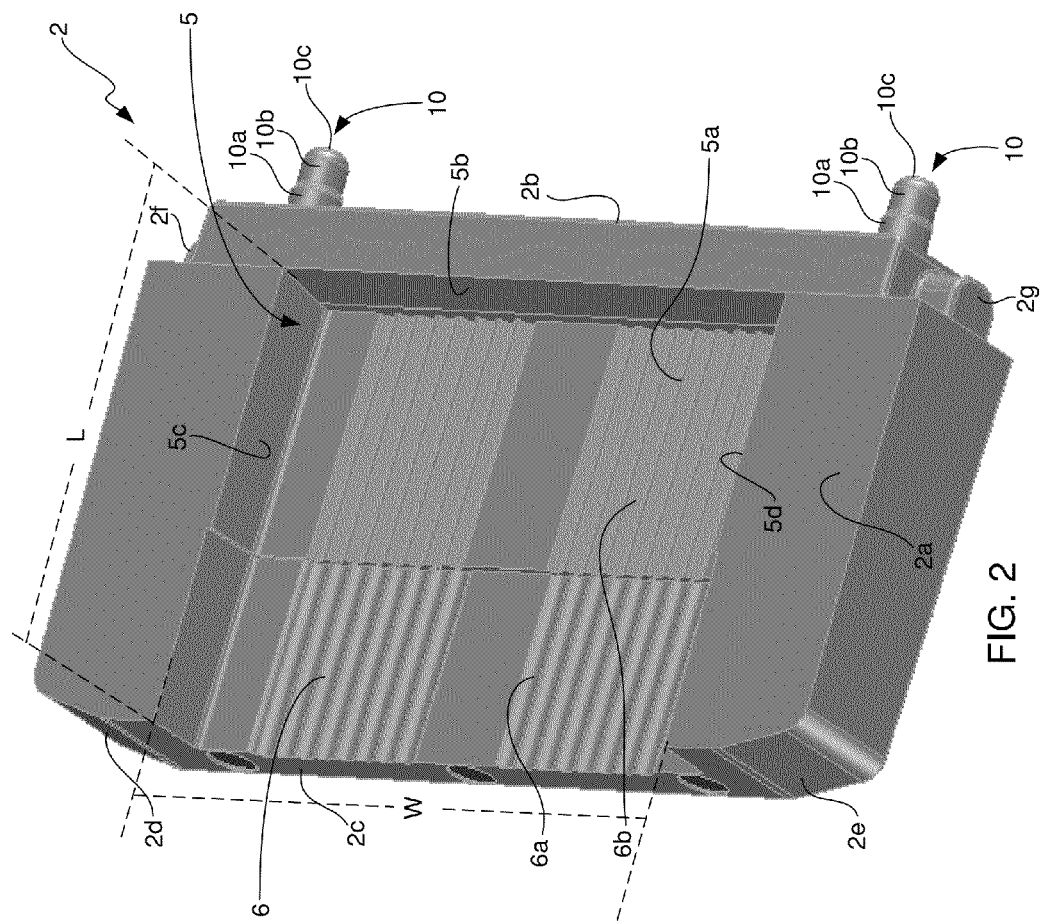
FIG. 2 illustrates a top perspective view of the module housing of the connector module shown in FIG. 1 with the cover and the optical fibers removed.
Figure 3:
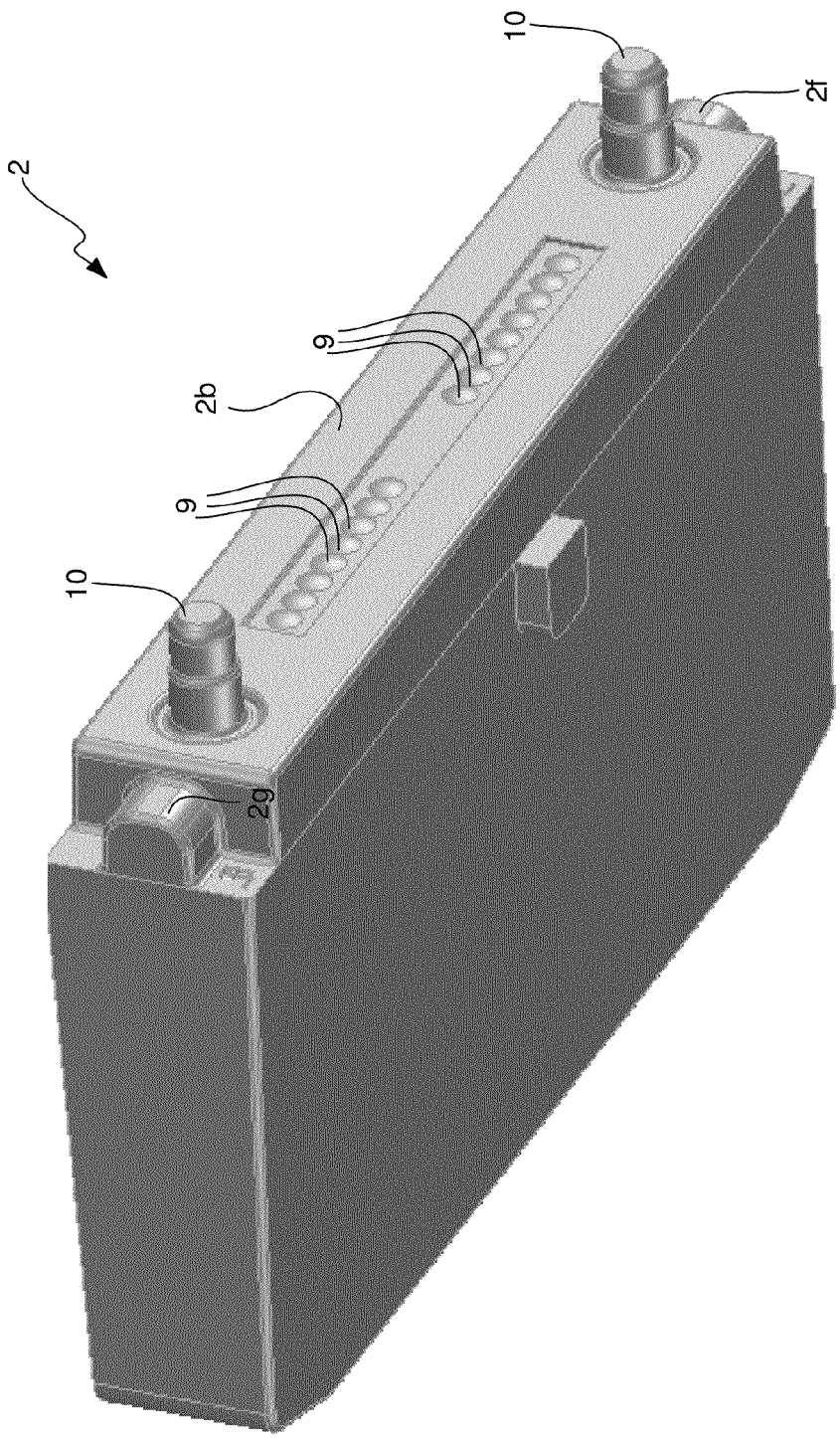
FIG. 3 illustrates a bottom perspective view of the module housing shown in FIG. 2.
Figure 4:
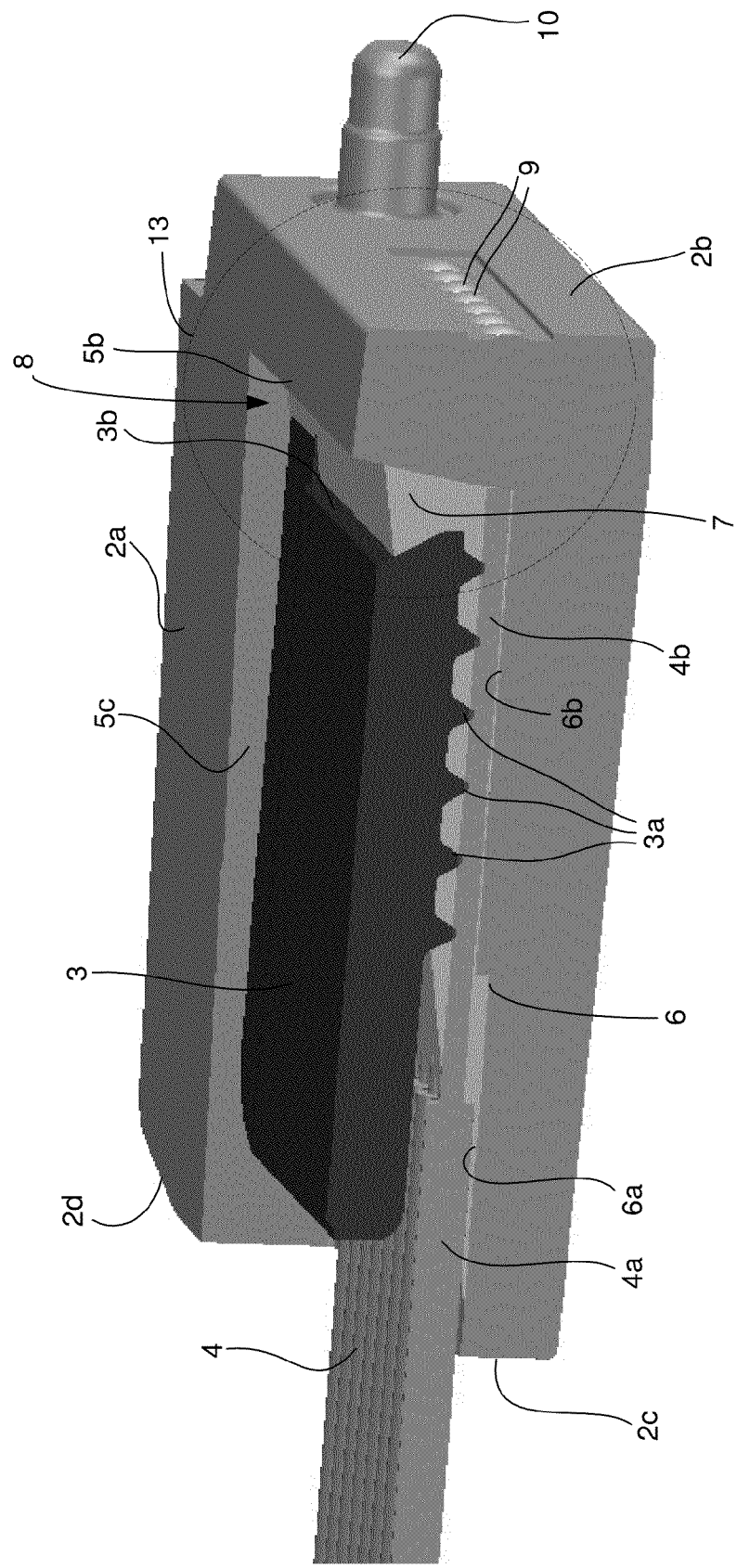
FIG. 4 illustrates a cross-sectional side perspective view of the multi-optical fiber connector module shown in FIG. 1.
Figure 5:
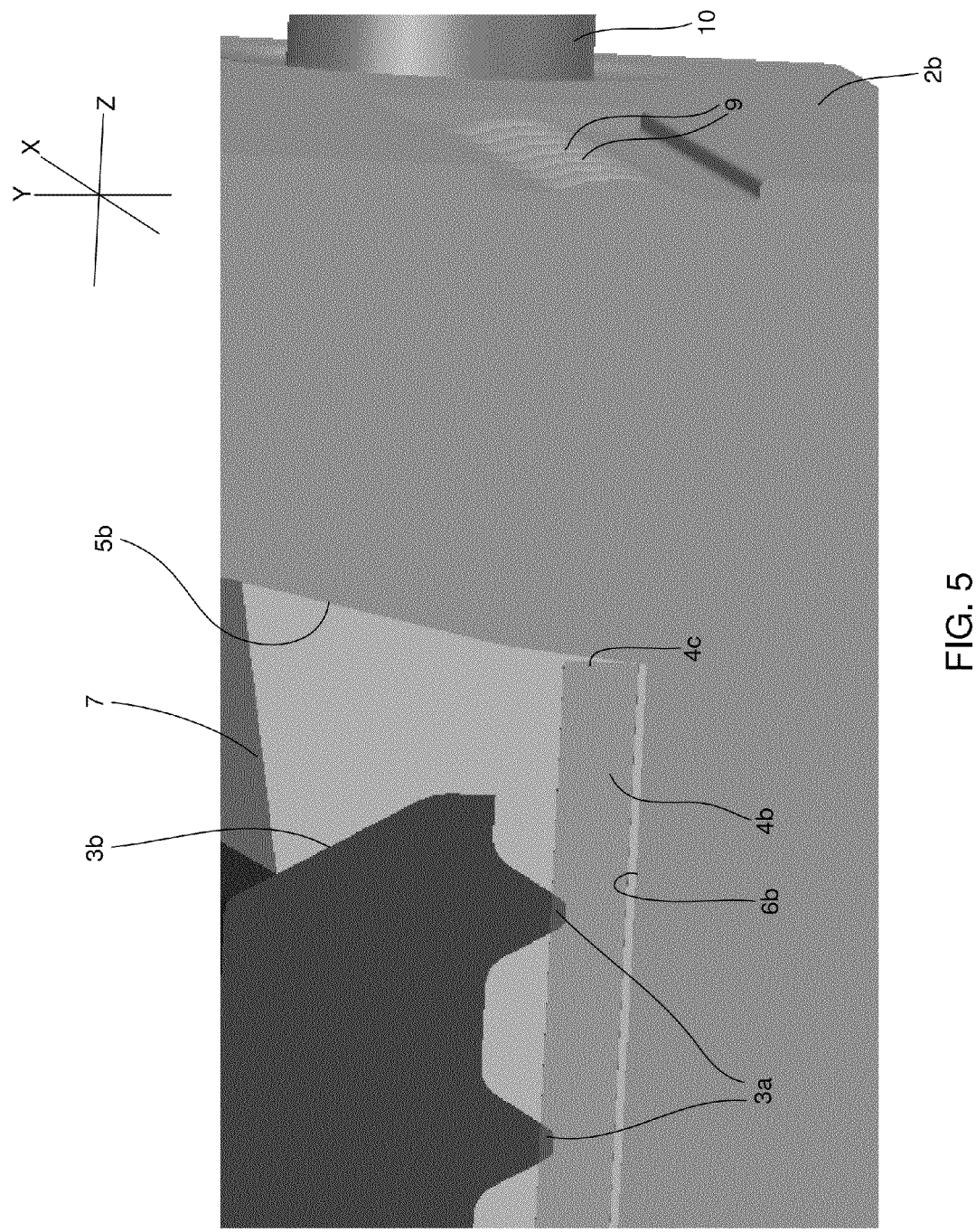
FIG. 5 illustrates an expanded view of the portion of the connector module that is within the dashed circle 13 shown in FIG. 4.
Figure 6:
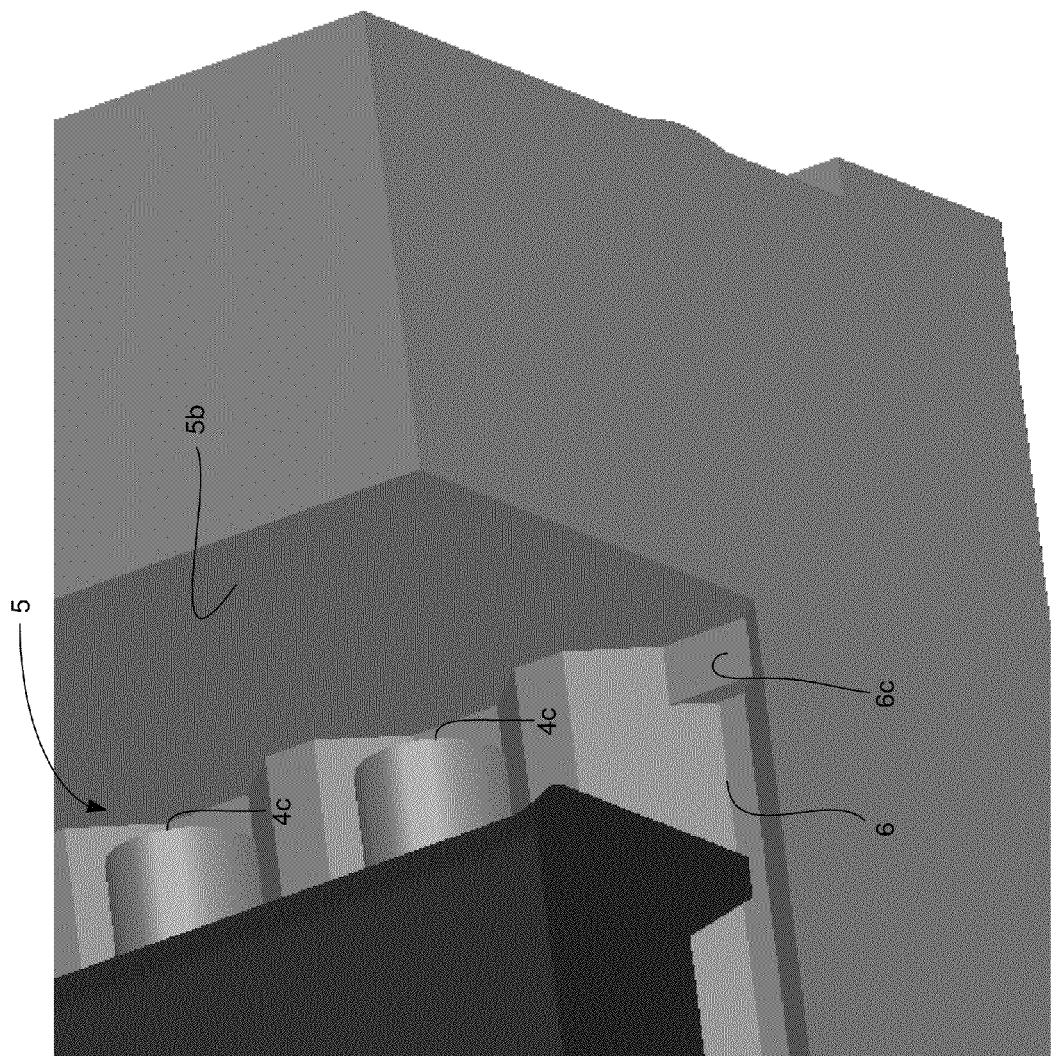
FIG. 6 illustrates an alternative embodiment of the module housing shown in FIG. 2.
Figure 7:
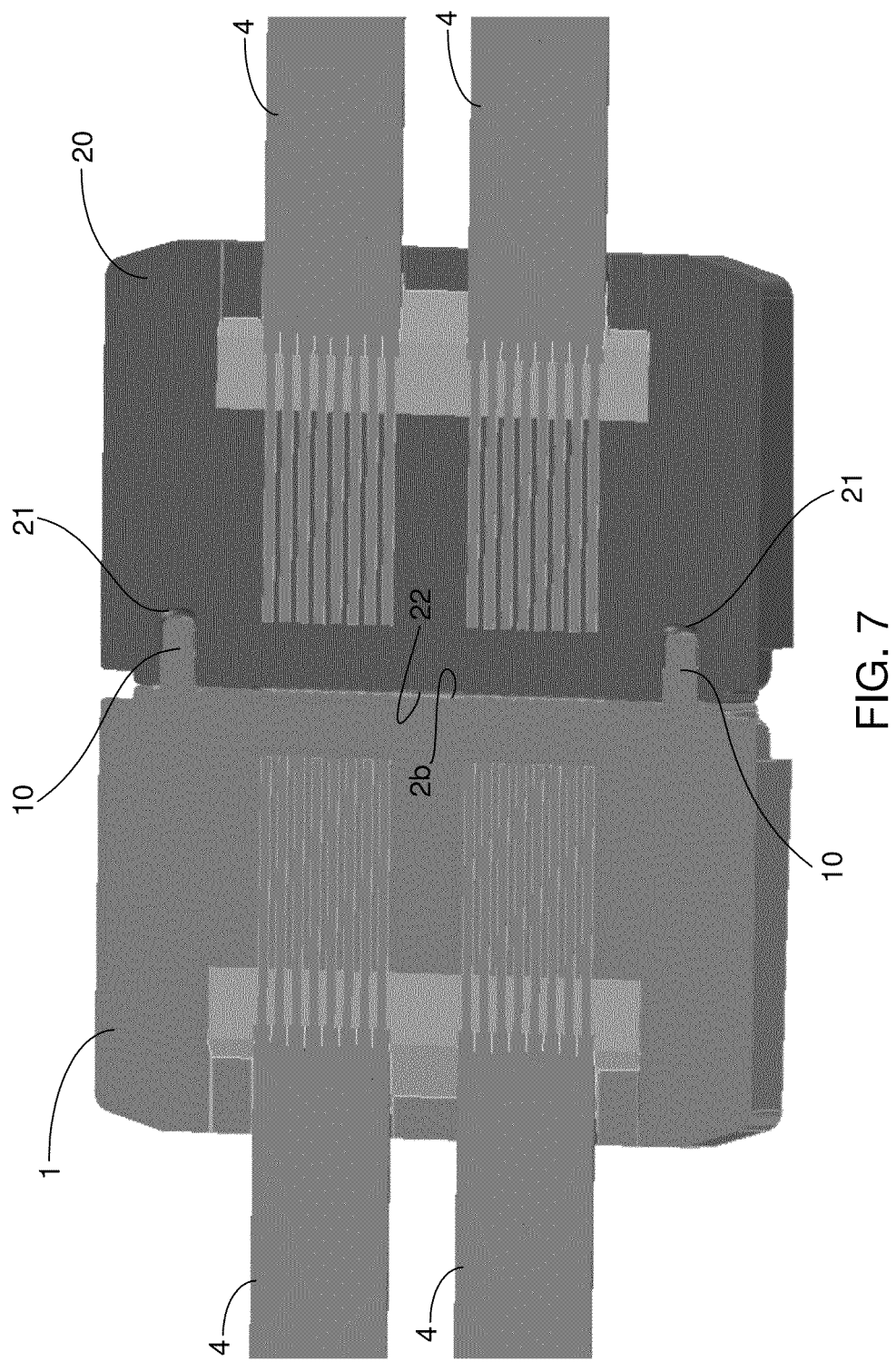
FIG. 7 illustrates a cross-sectional view of the multi-optical fiber connector module shown in FIG. 1 mated with a similarly-configured multi-optical fiber connector module.

FIG. 1 illustrates a side perspective view of the multi-optical fiber connector module 1 in accordance with an illustrative embodiment. The multi-optical fiber connector module 1 comprises a module housing 2 and a cover 3 and is shown in FIG. 1 connected to the cleaved and stripped ends (not shown) of a plurality of optical fibers 4. FIG. 2 illustrates a top perspective view of the module housing 2 shown in FIG. 1 with the cover 3 and the optical fibers 4 removed. FIG. 3 illustrates a bottom perspective view of the module housing 2 shown in FIG. 2. FIG. 4 illustrates a cross-sectional side perspective view of the multi-optical fiber connector module 1 shown in FIG. 1. FIG. 5 illustrates an expanded view of the portion of the module 1 that is within the dashed circle 13 shown in FIG. 4. FIG. 6 illustrates an alternative embodiment of the module housing 2 shown in FIG. 2. FIG. 7 illustrates a cross-sectional view of the multi-optical fiber connector module 1 shown in FIG. 1 mated with a similarly-configured multi-optical fiber connector module 20. Characteristics, elements and features of the multi-optical fiber connector module 1 will now be described with reference to FIGS. 1-7.

In accordance with this illustrative embodiment, there are a total of sixteen optical fibers 4 and the multi-fiber connector module 1 has sixteen respective optical pathways, although the invention is not limited with respect to the number of optical fibers that are connected to the connector module 1 or the number of optical channels that are provided in the connector module 1. The module housing 2 is typically a molded, unitary plastic part, although the invention is not limited with respect to the composition of the module housing 2. As will be described below in more detail, the cover 3 is deformable to an extent and is typically made of unfilled plastic such as, for example, unfilled polyvinyl chloride (PVC), unfilled polycarbonate, unfilled cyclic olefin copolymer (COC), or unfilled nylon.

The multi-optical fiber connector module 1 and the cover 3 have features that are similar or identical to features of a multi-optical fiber connector module and cover that are disclosed in U.S. Pat. No. 7,543,994 (hereinafter the '994 patent) and U.S. Pat. No. 7,553,091 (hereinafter the '091 patent), which are assigned to the assignee of the present application and which are incorporated by reference herein in their entireties.

As can be seen in FIG. 2, an upper surface 2a of the module housing 2 has a cavity 5 formed therein. The cavity 5 functions as an optical fiber holding chamber for holding the stripped and cleaved ends of the optical fibers 4 (FIG. 1). The cavity 5 has length, L, and width, W, dimensions (FIG. 2) that are approximately equal to, but slightly greater than, the length and width dimensions of the cover 3 (FIG. 1) so that the cover 3 can be gently placed in the cavity 5 with minimal force and held in place in the cavity 5 until the cover 3 has been secured in position with an adhesive material 7 (FIG. 1). The cavity 5 has a lower surface 5a in which a plurality of grooves 6 (FIG. 2) are formed. Each groove 6 has a first portion 6a and a second portion 6b. The first portions 6a of the grooves 6 are generally semi-cylindrical in shape such that they are complementary in shape to the cylindrically-shaped outer surfaces of the jackets of the optical fibers 4. The second portions 6b of the grooves 6 are V-shaped.

Prior to securing the ends of the optical fibers 4 within the cavity 5, each optical fiber 4 is cleaved and a portion of the jacket is stripped away, leaving a jacketed fiber portion 4a and an unjacketed fiber portion 4b, as can be seen in FIG. 4. The jacketed fiber portions 4a of the optical fibers 4 are positioned in the first portions 6a of the grooves 6 and the unjacketed fiber portions 4b are positioned in the second portions 6b of the grooves 6. When the cover 3 is placed in the cavity 5, deformable features 3a disposed on the bottom of the cover 3 come into contact with the unjacketed fiber portions 4b of the optical fibers 4. The deformable features 3a are slightly deformed by the forces exerted by the unjacketed fiber portions 4b on the features 3a during placement of the cover 3 in the cavity 5. A soft sheet metal leaf spring (not shown) may be used during the placement process to apply an evenly-distributed force across the top surface of the cover 3 to cause the features 3a to be deformed. The deformed features 3a partially wrap around the unjacketed fiber portions 4b such that the unjacketed fiber portions 4b are pinned between the respective V-shaped second portions 6b of the grooves 6 and the deformed features 3a.

After the cover 3 has been placed and oriented in the cavity 5 of the module housing 2, as shown in FIGS. 1 and 4, the aforementioned adhesive material 7, which is transparent to the primary wavelength of the optical signals being carried on the optical fibers 4, is dispensed into a gap 8 that exists between a forward end 3b of the cover 3 and a front wall 5b that partially defines the cavity 5. The adhesive material 7 has an index of refraction that is equal to, or approximately equal to, the index of refraction of the cores (not shown) of the fibers 4. The adhesive material 7 fills any imperfections in the cleaved ends of the optical fibers 4, thereby making the joints transparent to the optical beams so that no internal reflection occurs at this boundary. When the adhesive material 7 is dispensed into the gap 8, it fills the gap 8 and flows between, and is in contact with, the bottom of the cover 3 and the unjacketed fiber portions 4b, as shown in FIG. 4. The adhesive material 7 is also in contact with the walls 5b, 5c and 5d (FIG. 2) that define the cavity 5. Thus, when the adhesive material 7 cures and becomes hardened, it fixedly secures the ends of the unjacketed fiber portions 4b within the respective V-shaped second portions 6b of the grooves 6 and fixedly secures the cover 3 to the lower surface 5a and to the walls 5b, 5c and 5d of the cavity 5.

As shown in FIG. 4, the ends of the unjacketed fiber portions 4b are adjacent to, or in contact with, the wall 5b of the module housing 2. Respective openings are formed in the module housing 2 that extend in the axial directions of the grooves 6 from the cavity 5 through the wall 5b and through a front surface 2b of the module housing 2. Within these openings, respective collimating lenses 9 are disposed in the front surface 2b of the module housing 2. First and second passive fine alignment features 10 extend from the front surface 2b of the module housing 2. The passive fine alignment features 10 are identical in structure to one another and have stepped cylindrical shapes made up of first and second cylindrical portions 10a and 10b, where the first cylindrical portion 10a has a diameter that is greater than a diameter of the second cylindrical portion 10b. The passive fine alignment features 10 are rounded where they transition from the second cylindrical portions 10b to their ends 10c. The passive fine alignment features 10 are designed to mate with respective openings formed in another module (not shown), as will be described below in more detail.

Providing the passive fine alignment features 10 with the stepped cylindrical shape shown in FIGS. 1-4 provides some advantages over using long straight pins for this purpose. Long straight pins have the potential to stick as they are being inserted into the respective reciprocally-shaped openings formed in the mating module. This potential to stick is due to the nearly-continuous contact that occurs between the surfaces of the pins and the respective openings as they engage one another. If sticking occurs, it is possible that the respective passive fine alignment features will not fully engage one another, which can result in less than perfect misalignment.

One advantage of the stepped passive fine alignment features 10 is that there is less of a tendency to stick during insertion into the respective openings due to there being less surface-to-surface contact during insertion. This feature ensures that full mechanical coupling will occur, which ensures that precise optical alignment will be achieved. Another advantage is that the stepped cylindrical shapes are easier and less costly to manufacture than some other shapes, such as tapered shapes, which would also work well for this purpose.

With reference again to FIG. 1, a back side 2c of the module housing 2 has tapered snap features 2d and 2e located on opposite sides thereof. As will be described below in more detail, these tapered snap features 2d and 2e contribute to the ability of the connector module 1 to float when it is held within a plug (not shown) or receptacle (not shown). The term "float," as that term is used herein, is intended to denote a limited amount of movement of an object in the X- and/or Y- and/or Z-directions of the X, Y, Z Cartesian coordinate system shown in FIG. 1 relative to another object that is positioned in the same reference frame, as will be described below in more detail. The module housing 2 has retention features 2f and 2g located on opposite sides thereof that retain the connector module 1 within a receptacle (not shown) such that movement of the module 1 in the forward Z-direction indicated by arrow 12 (FIG. 1) is prevented while allowing some movement in one or more other directions, as will be described below in more detail.

With reference to FIG. 5, it can be seen that the wall 5b of the cavity 5 is curved, or tilted, relative to the X-Y plane. In contrast, the front surface 2b of the module housing 2 is in a plane that is parallel to the X-Y plane. Likewise, the cleaved end face 4c of the fiber 4 is generally parallel to the X-Y plane. Consequently, the end face 4c only abuts the wall 5b at the lower edge of the end face 4c, but is otherwise spaced apart from the wall 5b by a small gap. This small gap ensures that the adhesive material 7 covers all, or substantially all, of the end face 4c, thereby making the joint transparent to the optical beam. This feature prevents internal reflections from occurring at the interface between the end faces 4c and the lenses 9.

FIG. 6 illustrates an alternative embodiment of the module housing 2 for providing a small gap between the end faces 4c of the fibers 4 and the wall 5b of the cavity 5 to ensure that the adhesive material 7 (not shown) covers all, or substantially all, of the end face 4c. In accordance with this embodiment, stops 6c are formed at the ends of the grooves 6 where the grooves 6 meet the wall 5b. The stops 6c are very small in size relative to the diameter of the unjacketed fiber portions 4 so that only the lower edges of the end faces 4c abut the stops 6c. The stops 6c cause a gap to be created between the end faces 4c and the wall 5b that ensures that the adhesive material 7 covers all, or substantially all, of the end face 4c, thereby making the joint transparent to the optical beam to prevent internal reflections from occurring.

FIG. 7 illustrates a cross-sectional view of the multi-optical fiber connector module 1 shown in FIG. 1 mated with a similarly-configured multi-optical fiber connector module 20. The manner in which the passive fine alignment features 10 disposed on the connector module 1 mate with respective complementary-shaped openings 21 formed in the module 20 can be seen in FIG. 7. The complementary-shaped openings 21 correspond to the passive fine alignment features of module 20. It can be seen that when the modules 1 and 20 are in the fully-mated configuration shown in FIG. 7, the front surface 2b of the module 1 is in abutment with a front surface 22 of the module 20 and the optical pathways of the modules 1 and 20 are in precise optical alignment with one another. The module 20 has lenses (not shown) that are identical to the lenses 9 of module 1 and that are in optical alignment with the lenses 9 when the modules 1 and 20 are in the fully-mated configuration shown in FIG. 7. The mating of the passive fine alignment features 10 and 21 effectuates the aforementioned fine alignment process, but the aforementioned coarse alignment process is effectuated by engagement of respective passive coarse alignment features (not shown) that are disposed on devices or structures that hold arrays, or banks, of the modules 1 and 20, as will be described below in detail.

FIGS. 8A and 8B illustrate front and back perspective views, respectively, of a multi-optical fiber connector module 30 that is identical in structure to the connector module 100 disclosed in the '091 patent. Therefore, a detailed description of the connector module 30 will not be provided herein. Like the connector module 1 shown in FIG. 1, the connector module 30 includes a cover (not shown) that is identical to cover 3 (FIG. 1) that is secured to the module housing 31 to hold the ends of the optical fibers (not shown) in place. In FIGS. 8A and 8B, the cover is not shown for ease of illustration.

The connector module 30 shown in FIGS. 8A and 8B has some features or elements that are identical to features of the connector module 1 shown in FIGS. 1-7. The connector module 30 has tapered snap features 31a and 31b that perform the same functions as the snap features 2d and 2e of module 1, i.e., allowing the module 30 to float to some extent. The connector module 30 has retention features 31c and 31d that perform the same functions as the retention features 2f and 2g of module 1, i.e., retaining the connector module 30 within a receptacle (not shown) such that movement of the module 30 in the forward Z-direction (arrow 32 in FIG. 8A) is prevented while allowing some movement in one or more other directions, as will be described below in more detail. The connector module 30 has tapered passive fine alignment features 33 that are different from the stepped passive fine alignment features 10 of the connector module 1, but perform the same fine alignment process described above with reference to passive fine alignment features 10.

Figure 9:
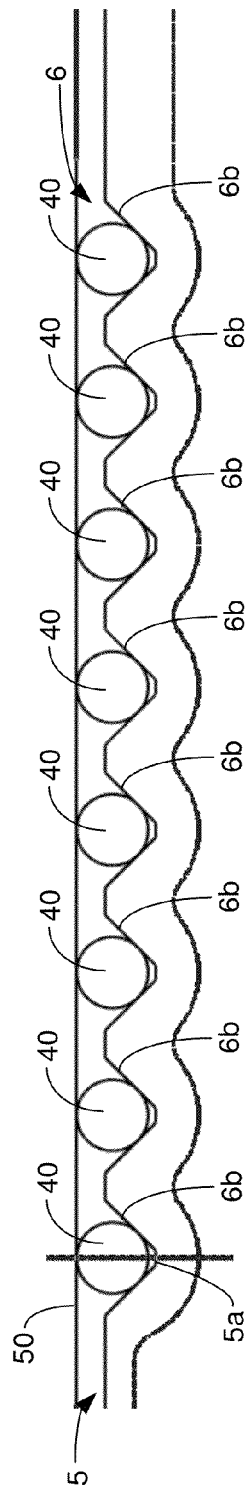
FIG. 9 illustrates a plan view of ends of a plurality of optical fibers positioned in the V-shaped second portions of the grooves of the module housing shown in FIG. 4.

The preference to provide the cover 3 shown in FIGS. 1 and 4-6 with the deformable features 3a shown in FIG. 4 will now be described with reference to FIGS. 9 and 10. Further details of this illustrative embodiment of the cover 3 will then be described with reference to FIGS. 11A and 11B. FIG. 9 illustrates a plan view of ends 40 of a plurality of optical fibers positioned in the V-shaped second portions 6b of the grooves 6 of the module housing 2 shown in FIG. 4. For illustrative purposes, the fiber ends 40 are illustrated as having the same diameter. The horizontal line 50 represents the bottom surface of a cover that is perfectly flat and does not include the deformable features 3a of the cover 3 shown in FIG. 4. For illustrative purposes, all of the V-shaped second portions 6b of the grooves 6 are shown as being identically dimensioned.

It can be seen in FIG. 9 that when all of the fibers have precisely the same diameter and all of the V-shaped second portions 6b are identically dimensioned, the bottom surface 50 of the cover makes equal contact with all of the fiber ends 40 so that they are held perfectly against the respective V-shaped second portions 6b of the grooves 6. In this case, it is not necessary to provide the cover with deformable features. Due to manufacturing tolerances, however, the fibers 40 typically will not have precisely the same diameter and the V-shaped second portions 6b of the grooves 6 will not have identical dimensions.

Figure 10:
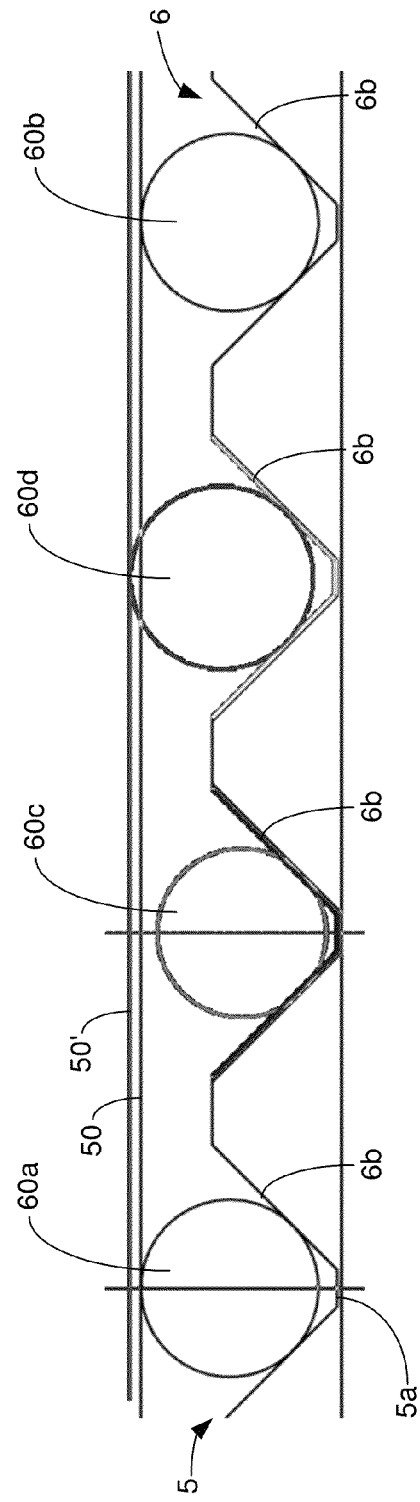
FIG. 10 illustrates a plan view of ends of a plurality of optical fibers positioned in the V-shaped second portions of the grooves of the module housing shown in FIG. 4.
Figure 11:
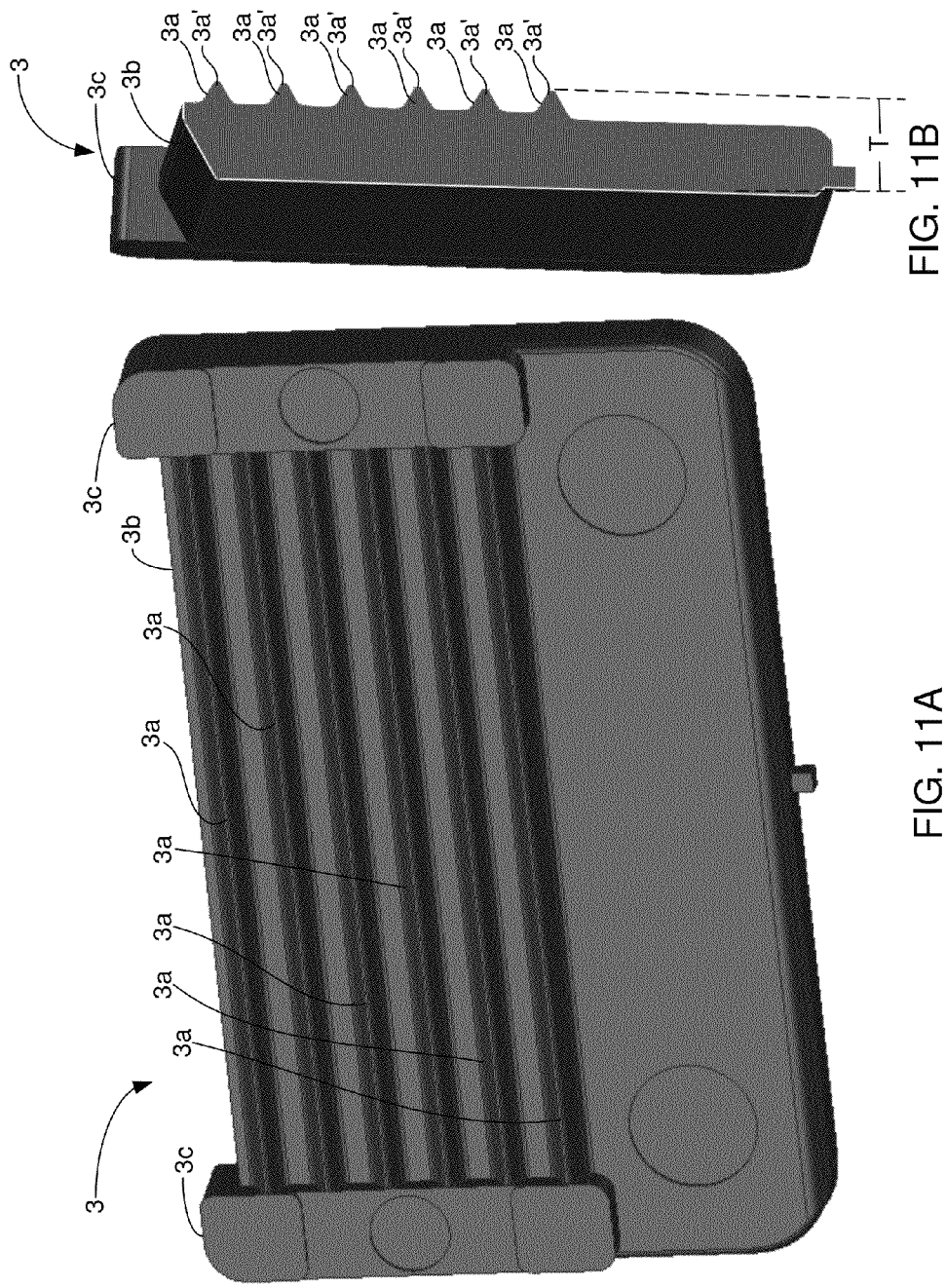
FIGS. 11A and 11B illustrate bottom and side cross-sectional views, respectively, of the cover shown in FIGS. 1 and 4-6.

FIG. 10 illustrates a plan view of ends 60 of a plurality of optical fibers positioned in the V-shaped second portions 6b of the grooves 6 of the module housing 2 shown in FIG. 4. For illustrative purposes, some of the fiber ends 60 are illustrated as having the different diameters and some of the V-shaped second portions 6b of the grooves 6 are shown as having slightly different shapes and/or sizes and/or positions. In FIG. 10, the two fiber ends 60a and 60b have the same diameters as the fiber ends 40 shown in FIG. 9. The fiber end 60c has a slightly smaller diameter than the fiber ends 40. The fiber end 60d has a slightly larger diameter than the fiber ends 40. The horizontal line 50 represents the location of the bottom surface 50 of the cover in FIG. 9 whereas the horizontal line 50' represents the new location of the bottom surface of the cover.

It can be seen in FIG. 10 that the bottom surface 50' of the cover is now farther away from the lower surface 5a of the cavity 5 than it was when the fiber ends 40 were perfectly sized to have equal diameters. The bottom surface 50' is now in contact only with fiber end 60d. Therefore, only fiber end 60d is pinned between the bottom surface 50' of the cover and the respective V-shaped second portion 6b of the groove 6. The other fiber ends 60a, 60b and 60c are floating loose. Consequently, it is possible that these fiber ends 60a, 60b and 60c will be pointed in directions that are not aligned with the optical pathways of the connector module 1 (FIG. 1). For example, assuming that the optical pathways are parallel to the grooves 6, the fiber ends 60a, 60b and 60c may be at non-zero degree angles to the optical pathways, which can lower optical coupling efficiency and cause signal degradation.

The problem described above with reference to FIG. 10 can be solved in different ways. One solution would be to use a separate cover for each optical fiber. Another solution would be to use spring or spring-type features on the cover to bias the fiber ends into position. However, both of these solutions would increase the overall cost of the connector module. In addition, using springs or spring-type features would increase the thickness of the connector module, which also is undesirable.

FIGS. 11A and 11B illustrate a bottom perspective view and a side cross-sectional view, respectively, of the cover 3 shown in FIGS. 1 and 4-6. In accordance with this illustrative embodiment, the deformable features 3a are ridges. The tips 3a' of each of the ridges 3a come into contact with all of the unjacketed fiber portions 4b (FIG. 4) such that each of the unjacketed fiber portions 4b is sandwiched, or pinned, between multiple tips 3a' of multiple ridges 3a and the respective V-shaped second portions 6b of the grooves 6. Having this many points of contact between the cover 3 and the fiber portions 4b ensures that the fiber ends will remain in alignment with the optical pathways of the module 1 (FIG. 4).

As indicated above, the entire cover 3 is typically a unitary molded part made of unfilled plastic such as, for example, but not limited to, unfilled PVC, unfilled polycarbonate, unfilled COC, or unfilled nylon. Making the cover 3 as a molded part of unfilled plastic ensures that the tips 3a' will quickly crush under low force as they come into contact with the unjacketed fiber portions 4b to permanently deform about the unjacketed fiber portions 4b without damaging the unjacketed fiber portions 4b. The tips 3a' have a lower hardness than the unjacketed fiber portions 4b so that the force that is required to permanently deform the tips 3a' is less than the force that is required to deform, or dent, the fiber portions 4b. This feature ensures that the tips 3a' will deform before any damage occurs to the unjacketed fiber portions 4b.

The permanent deformation of the tips 3a' about the fiber portions 4b ensures that the unjacketed fiber portions 4b will be firmly held in alignment with the respective optical pathways of the module 1. In addition, by employing features that permanently deform under low force rather than elastic features that perform spring-type functions, the cover 3 can have a very small thickness, T (FIG. 11B), and can be made thinner than if spring-type, or elastic, features were employed. This enables the cover 3 to be made at very low cost.

It can be seen in FIGS. 11A and 11B that the cover 3 has stops 3c formed on its forward end. These stops 3c come into contact with the inner surface of the wall 5b of the cavity 5 (FIG. 1) to provide the gap 8 that exists between the forward end 3b of the cover 3 and the wall 5b that partially defines the cavity 5. As described above, the adhesive material 7 is dispensed into the gap 8 and fills the gap 8 and flows between, and is in contact with, the bottom of the cover 3 and the unjacketed fiber portions 4b (FIG. 4). The adhesive material 7 is also in contact with the walls 5b, 5c and 5d (FIG. 2) that define the cavity 5 such that when the adhesive material 7 cures and becomes hardened, it fixedly secures the ends of the unjacketed fiber portions 4b within the respective V-shaped second portions 6b of the grooves 6 and fixedly secures the cover 3 to the lower surface 5a and to the walls 5b, 5c and 5d of the cavity 5. The ridges 3a perform an additional function of providing some distance between the bottom surface of the cover and the lower surface 5a of the cavity that allows the adhesive material 7 to flow more easily throughout the cavity 5 to make good contact with the walls 5b, 5c and 5d, the unjacketed fiber portions 4b and the bottom surface of the cover 3.

Figure 12:
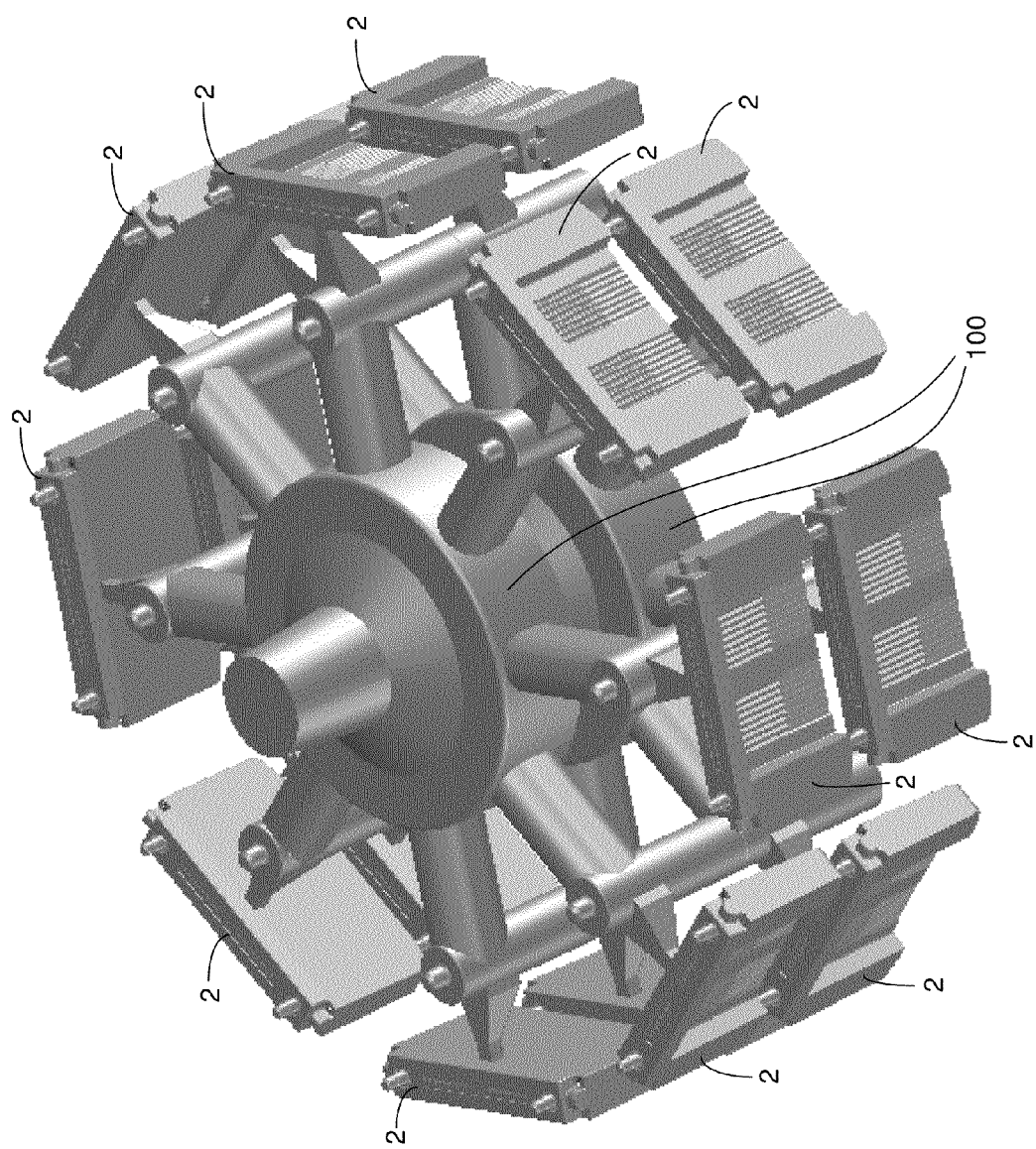
FIG. 12 illustrates a perspective view of two stacked molded plastic wheels, each of which includes eight of the module housings shown in FIG. 2.

FIG. 12 illustrates a perspective view of two stacked molded plastic wheels 100, each of which includes eight of the module housings 2 shown in FIG. 2. Each wheel 100 is formed as a unitary plastic molded part. Typically, four of the wheels 100 are molded at the same time in a hot runner molding machine (not shown). The wheels 100 are then stacked by the molding machine. Subsequently, the stacks of wheels 100 are delivered to the location at which assembly of the multi-optical fiber connector module 1 shown in FIG. 1 will occur. During the assembly process, which is described below in more detail with reference to FIGS. 15 and 16, an automated assembly system handles the wheels 100 and assembles the modules 1 without the modules 1 ever being touched by a human being. This lessens the likelihood that the modules 1 will be damaged during the assembly process.

Figure 13:
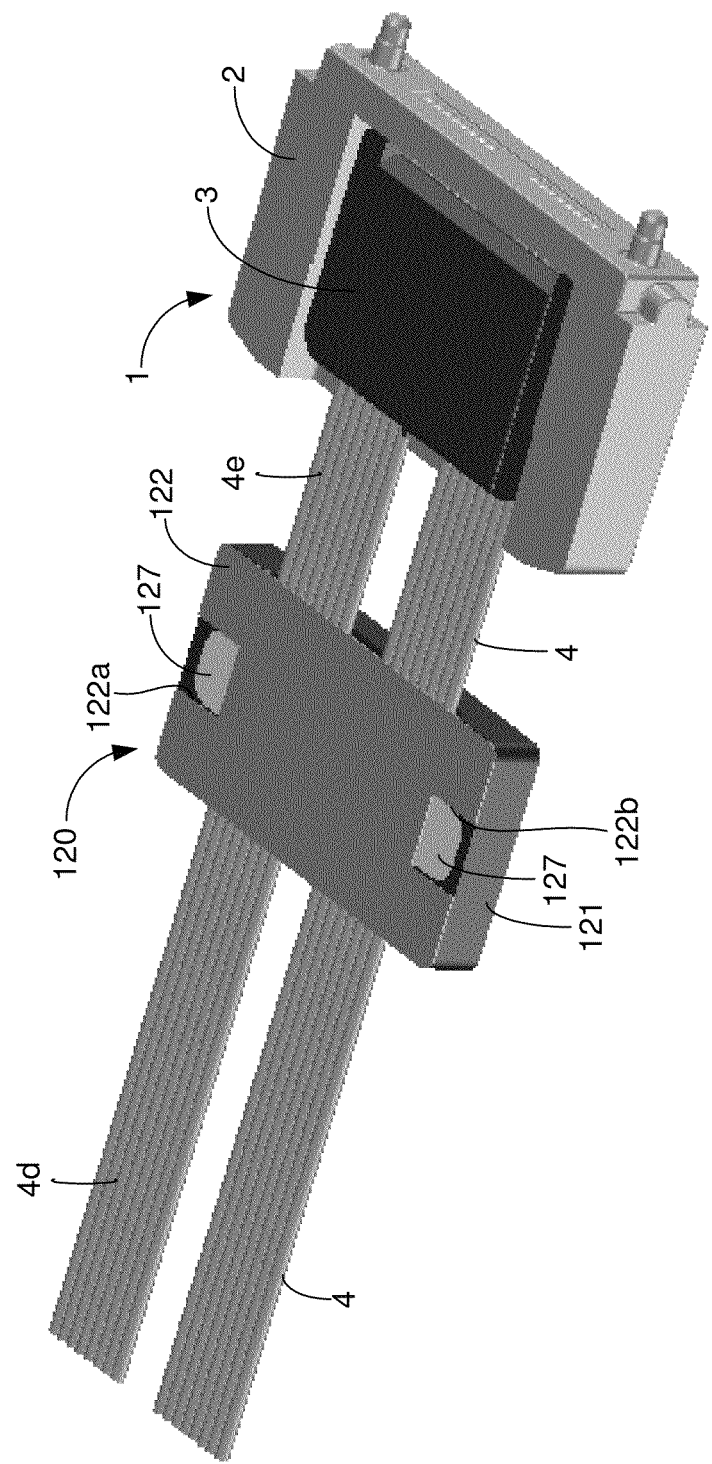
FIG. 13 illustrates a top perspective view of a cleave holder in accordance with an illustrative embodiment and the multi-optical fiber connector module shown in FIG. 1.
Figure 14A:
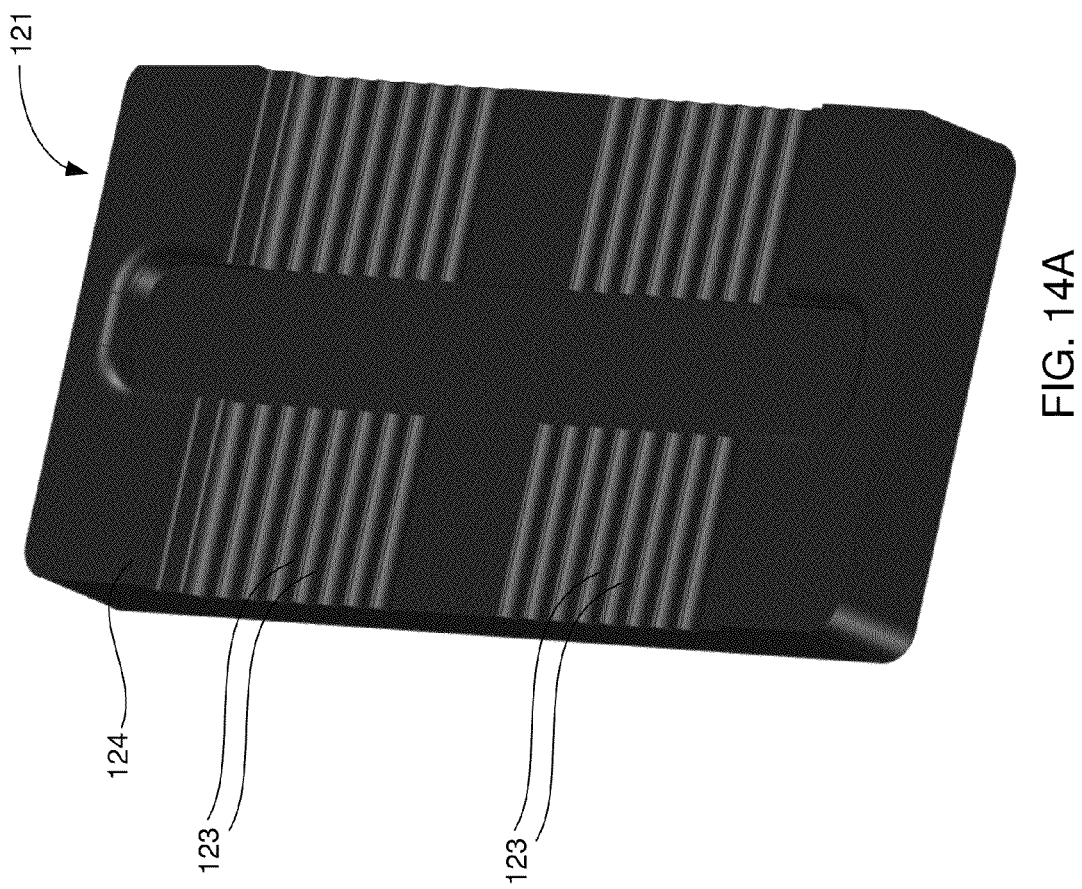
FIG. 14A illustrates a top perspective view of the unitary body of the cleave holder shown in FIG. 13 with the piece of tape shown in FIG. 13 removed to show grooves that are formed in an upper surface of the body of the cleave holder.
Figure 14B:
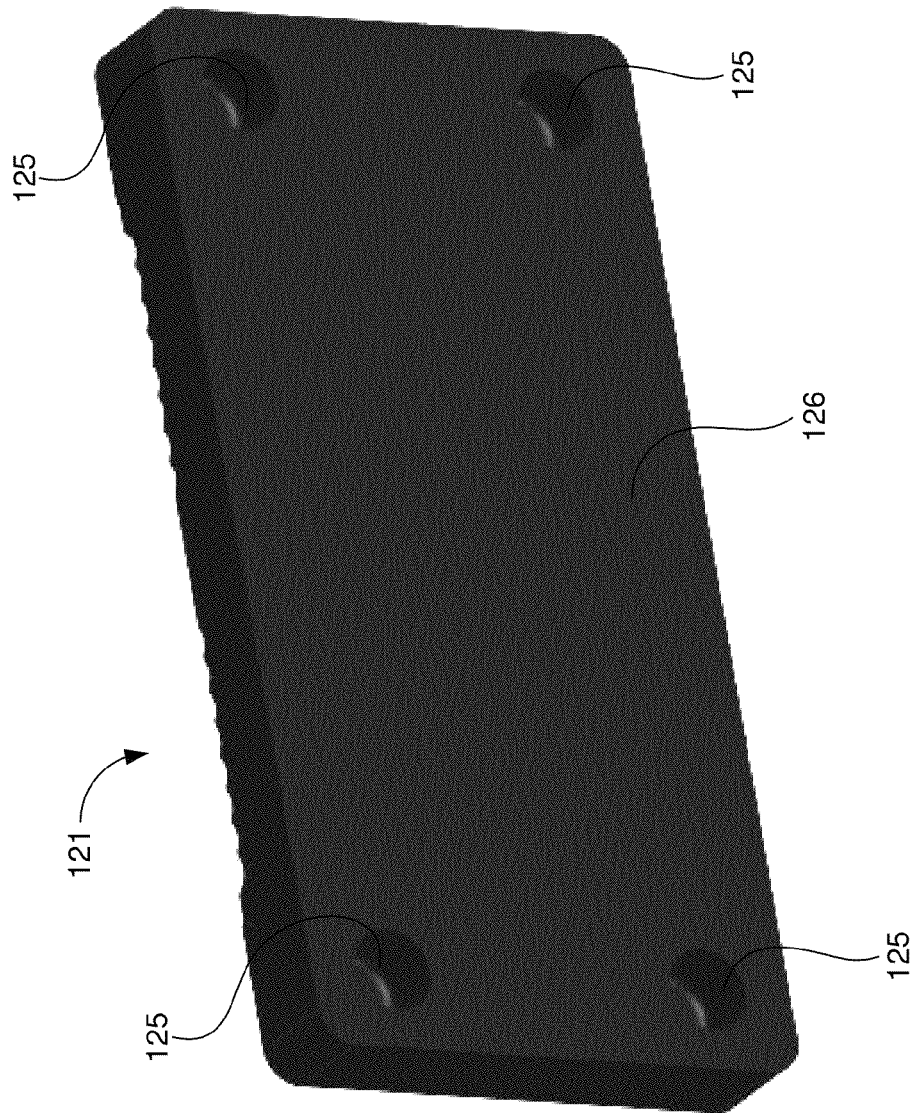
FIG. 14B illustrates a bottom perspective view of the body of the cleave holder shown in FIG. 13 that shows four tooling reference holes that are formed in a lower surface of the body.
Figure 14C:
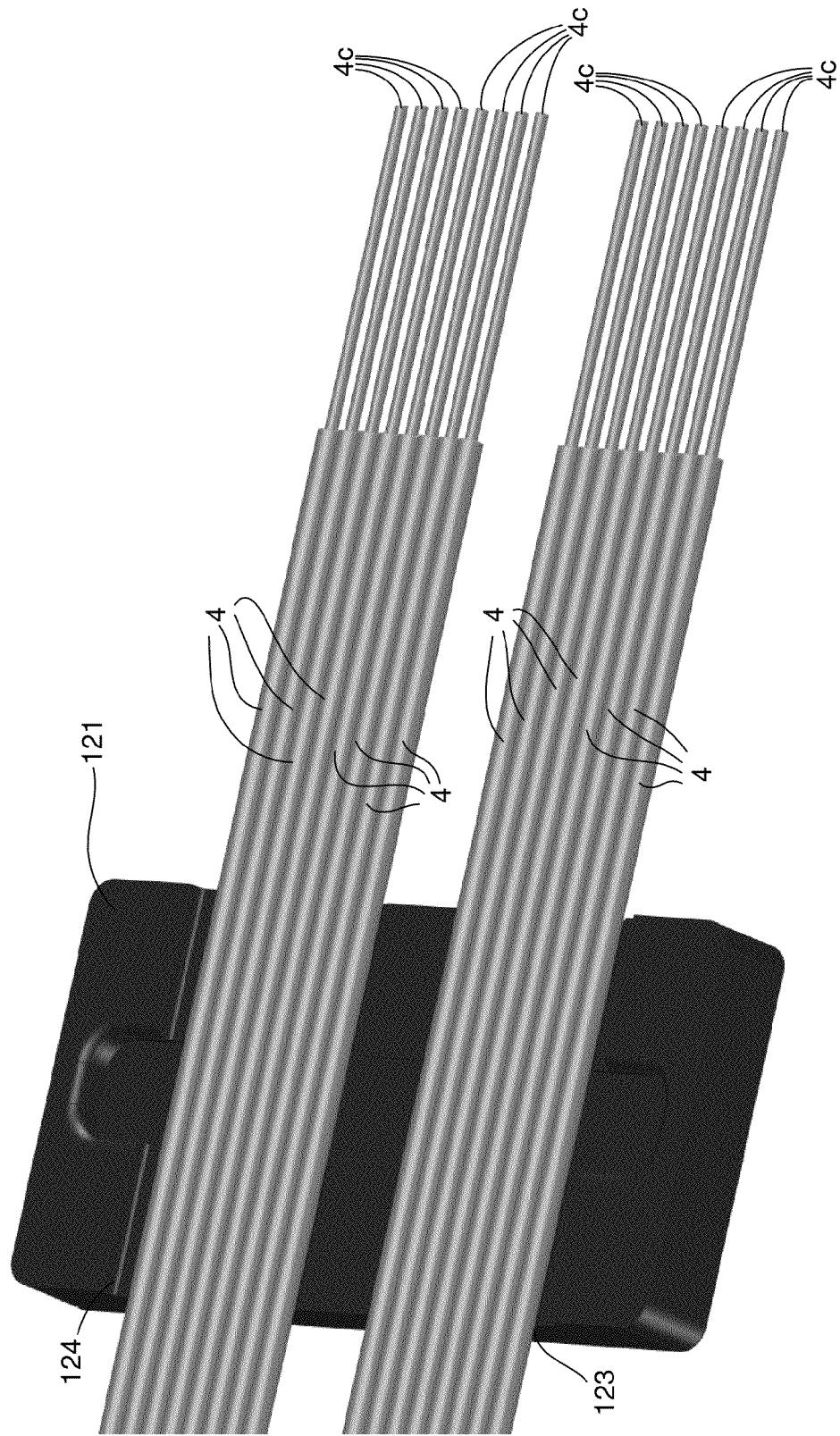
FIG. 14C illustrates a top perspective view of the body of the cleave holder shown in FIG. 14A with fibers laid in the grooves that are formed in the upper surface of the body.

Prior to describing the assembly process, the cleave holder that is used to hold the fibers 4 (FIG. 1) as they are stripped and cleaved will be described with reference to FIGS. 13-14C. FIG. 13 illustrates a top perspective view of an assembly that includes a cleave holder 120 in accordance with an illustrative embodiment and the multi-optical fiber connector module 1 shown in FIG. 1. In accordance with this illustrative embodiment, the cleave holder 120 remains secured to the fibers 4 even after the module 1 has been assembled and secured to the stripped and cleaved ends (not shown) of the fibers 4. The cleave holder 120 comprises a molded plastic unitary body 121 and a piece of adhesive-backed tape 122. FIG. 14A illustrates a top perspective view of the body 121 with the piece of tape 122 removed to show grooves 123 that are formed in an upper surface 124 of the body 121. FIG. 14B illustrates a bottom perspective view of the body 121 that shows four tooling reference holes 125 that are formed in a lower surface 126 of the body 121. FIG. 14C illustrates a top perspective view of the body 121 with the piece of tape 122 removed to show length-wise portions of the fibers 4 that are laid in the grooves 123 that are formed in the upper surface 124 of the body 121.

Prior to placing the fibers 4 in the grooves 123, the body 121 of the cleave holder 120 is mounted on a stripper and cleaver tool (not shown) that has four pins (not shown) that are shaped, sized and positioned to be received in the four tooling reference holes 125 in a precision fit. After the body 121 has been mounted on the stripper and cleaver tool, the fibers 4 are placed in the respective grooves 123 and the piece of adhesive-backed tape 122 is placed on the body 121 over the fibers 4 with a first adhesive material disposed on the back of the piece of tape 122 in contact with the body 121, as shown in FIG. 13. The piece of tape 122 has cutaway areas 122a and 122b formed in it into which drops of a second adhesive material 127, such as cyanoacrylate, for example, are dispensed. The second adhesive material 127 comes into contact with the portions of the fibers 4 that are disposed in the grooves 123 and with the upper surface 124 of the body 121 of the cleave holder 120 and the lower surface of the piece of tape 122. When the adhesive material 127 cures and becomes hardened, it fixedly secures the fibers 4 in position in between the back of the piece of tape 122 and the respective grooves 123 in which the fibers 4 are positioned.

It should be noted that it may not be necessary to use both the first and second adhesive materials in order to secure the portions of the fibers 4 in position within the respective grooves 123. In other words, the tape 122 or the adhesive material 127, but not both, may be sufficient for performing this function. Also, some other type of mechanism or device, such as a cover similar to cover 3, may instead be used for this purpose. The piece of tape 122 essentially acts as a cover, but other types of covers or securing devices, features or elements may be used for this purpose, as will be understood by those skilled in the art in view of the description being provided herein. Therefore, the term "cover," as that term is used in connection with the cleave holder, is intended to denote any device, mechanism, element or material that covers the length-wise portions of the fibers 4 that are held within the grooves 123 and secures them in position on the body 121 of the cleave holder 120.

With the fibers 4 fixedly secured in position within the cleave holder 120, and with the cleave holder body 121 mounted on the stripper and cleaver tool, the fibers 4 are stripped and the ends are cleaved with very high precision such that the length of the fibers 4 from a particular location in the cleave holder 120 to the fiber end faces 4c (FIG. 14C) is equal to a very precise, predetermined value. Because stripper and cleaver tools that are suitable for this purpose are well known, an example of a stripper and cleaver tool that may be used for this purpose will not be provided herein in the interest of brevity. The only change that would need to be made to such a known stripper and cleaver tool is that it would need to include pins that are positioned, shaped and sized to mate with the holes 125 (FIG. 14B) formed in the body 121 of the cleave holder 120, or the stripper and cleaver tool would need to be configured for use with an adapter that had such pins and that could be mounted on the stripper and cleaver tool. Persons of skill in the art would know how to adapt an existing stripper and cleaver tool for this purpose.

Figure 15:
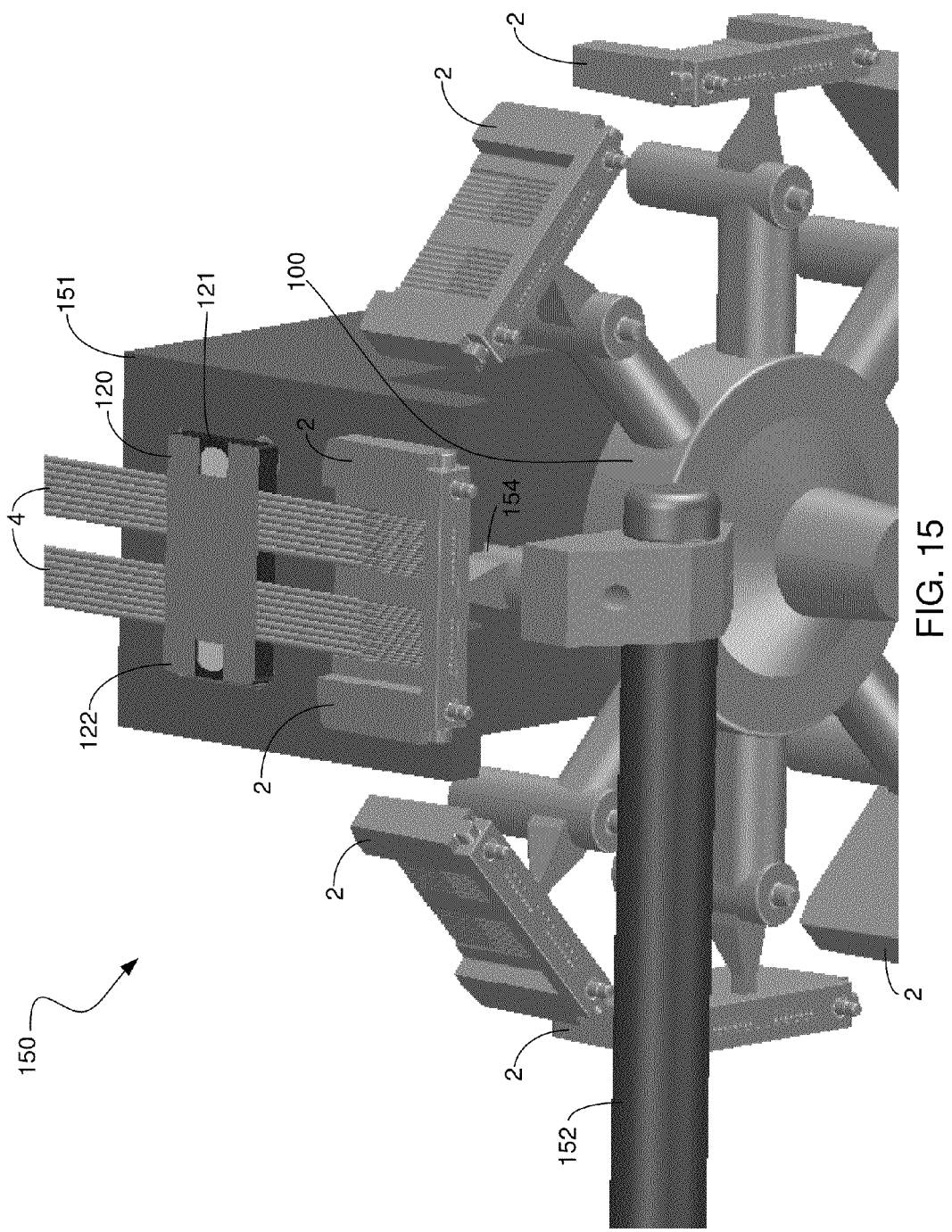
FIG. 15 illustrates a top perspective view of an assembly system that is used to assemble the multi-optical fiber connector module shown in FIG. 1 before a cover has been secured to the module.
Figure 16:
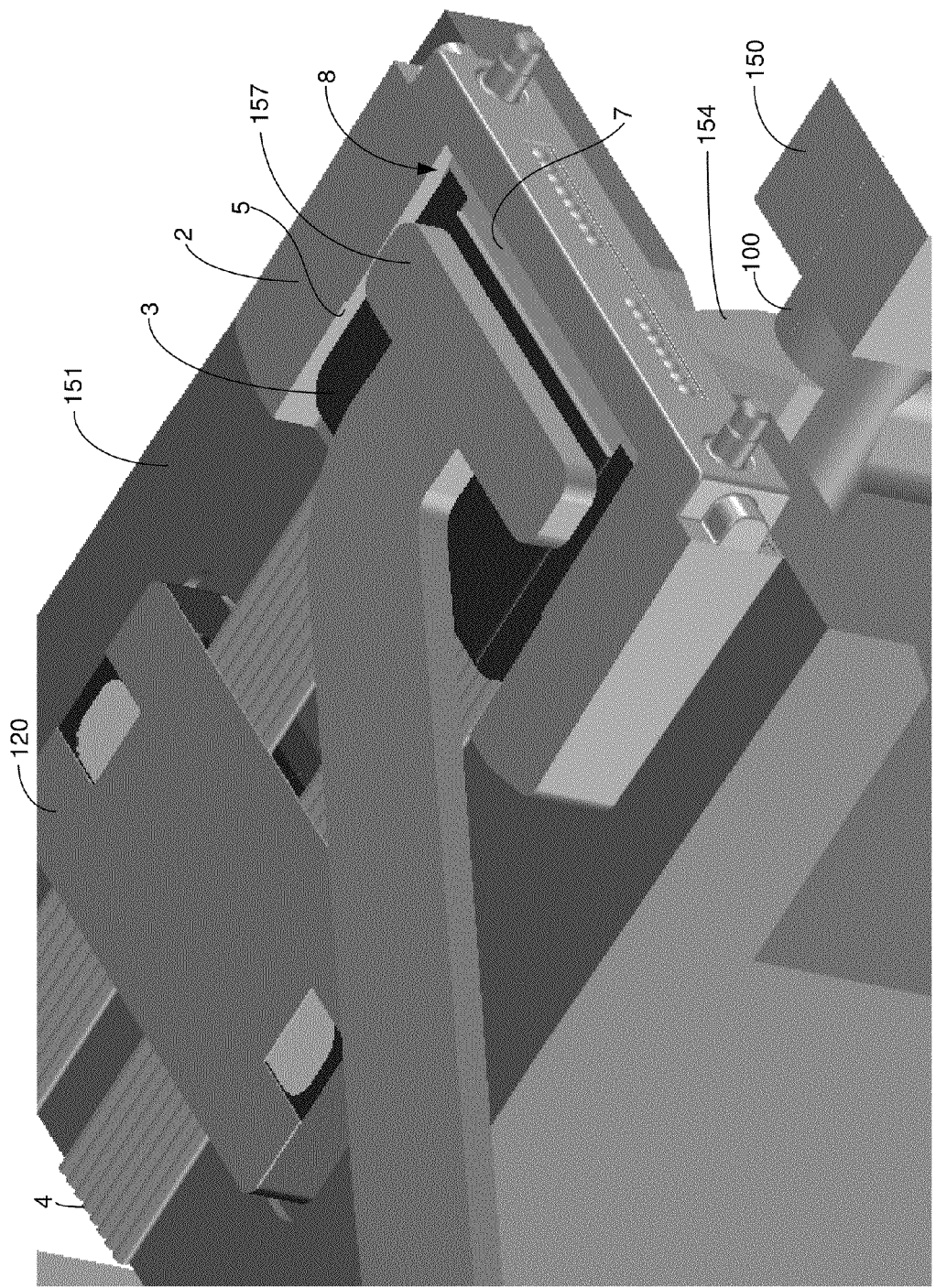
FIG. 16 illustrates a top perspective view of the assembly system shown in FIG. 15 during assembly of the multi-optical fiber connector module shown in FIG. 1 as a cover is being secured to the module.

FIGS. 15 and 16 illustrate top perspective views of an assembly system 150 that is used to assemble the multi-optical fiber connector module 1 and to secure the module 1 to the fibers 4. The assembly system 150 includes an assembly fixture 151 on which the wheel 100 that contains the module housing 2 is mounted and on which the cleave holder 120 is mounted. An automated arm 152 of the assembly system 150 maneuvers the wheel 100 relative to the assembly fixture 151 until a portion 154 of the wheel 100 just below a selected one of the module housings 2 engages the assembly fixture 151. When this portion 154 of the wheel 100 is engaged with the assembly fixture 151, the selected module housing 2 is at a precise position and orientation on the assembly fixture 151. The assembly fixture 151 also includes four pins (not shown) that are positioned, shaped and sized to be received in the four tooling reference holes 125 formed in the lower surface of the cleave holder body 121. Thus, when the portion 154 of the wheel 100 is engaged with the assembly fixture 151 and the cleave holder 120 is mounted on the assembly fixture 151, the fibers 4 are precisely positioned in the respective V-shaped grooves 6 (FIG. 2) and the respective end faces 4c are precisely located in the module housing 2.

Once the fibers 4 are precisely positioned in the V-shaped grooves 6 of the module housing 2 as shown in FIG. 15, the cover 3 (FIG. 16) is placed in the cavity 5 of the module housing 2 by a person using a finger or a tool, such as a pair of tweezers, for example. The process of placing the cover 3 in the cavity 5 could also be performed automatically by the system 150. A spring finger 157 of the system 150 gently holds the cover 3 in position as the adhesive material 7 is placed in the gap 8, as shown in FIG. 16. When the adhesive material 7 cures and becomes hardened, it locks the cover 3 and the fibers 4 in place on the module housing 2. A tool (not shown) may then be used to cut through the portion 154 of the wheel 100 in order to separate the wheel 100 from the module housing 2. The assembly that includes the module 1, the cleave holder 120 and the portions of the fibers 4 that are attached to the module 1 and to the cleave holder 120 may then be removed from the assembly fixture 151 of the assembly system 150.

As indicated above, both the cleave holder 120 and the module 1 will typically remain attached to the fibers 4 in the configuration shown in FIG. 13. The cleave holder 120 may be mounted on a housing (not shown) by mating the holes 125 (FIG. 14B) of the cleave holder body 121 with respective pins (not shown) that are disposed on the housing. In this way, the cleave holder 120 can act as a strain relief mechanism by preventing forces that are exerted on the portions 4d (FIG. 13) of the fibers 4 from being exerted on portions 4e (FIG. 13) of the fibers 4 that extend in between the cleave holder 120 and the module 1. However, the cleave holder 120 is not limited to being used with the module 1 or with any other module. After the fibers 4 have been stripped and cleaved, the cleave holder 120 may remain attached to the fibers 4 and used for some purpose even if the end faces of the fibers 4 are not secured to a module. For example, if the end faces of the fibers 4 are to be mechanically and optically interfaced with a piece of equipment that does need include a connector module, the cleave holder 20 may be mounted on pins disposed on a housing or chassis of the equipment to ensure that the end faces of the fibers are at a predetermined, precise distance from the cleave holder 20. In such cases, the cleave holder 120 would also perform strain relief functions.

It should be noted that the invention has been described with reference to illustrative, or exemplary, embodiments in order to demonstrate the principles and concepts of the invention. As will be understood by those of skill in the art, the invention is not limited to the illustrative embodiments described herein. For example, the cleave holder 120 is not limited to having the shape shown in the figures and is not limited to being used with the connector module 1. Persons skilled in the art will understand, in view of the description provided herein, that a variety of modifications can be made to the embodiments described herein and that all such modifications are within the scope of the invention.

What is claimed is:

1. An assembly comprising:
a cleave holder, the cleave holder comprising a unitary body and a cover, the unitary body having a plurality of grooves formed in an upper surface thereof and having a plurality of reference holes formed in a lower surface thereof, the grooves holding length-wise first portions of respective optical fibers, the optical fibers also having second portions that extend from a rear side of the cleave holder and third portions that extend from a front side of the cleave holder, the cover being permanently affixed to the unitary body such that a backside of the cover is in contact with the unitary body and with the length-wise first portions of the optical fibers held in the grooves and serving to hold the length-wise first portions of the optical fibers in fixed positions within the cleave holder so that a part of the third portions of the optical fibers extending from the front side of the cleave holder can be stripped and cleaved creating unjacketed portions of the optical fibers with cleaved ends; and
a connector module positioned apart from the cleave holder, the connector module holding the cleaved ends of the optical fibers that extend from the front side of the cleave holder in fixed, precise locations within the connector module,
wherein the cleave holder is configured to operate as a strain relief device for the optical fibers held by the connector module.

2. The assembly of claim 1, wherein the cover of the cleave holder is a piece of adhesive-backed tape, the piece of adhesive-backed tape being disposed on the unitary body such that a first adhesive material disposed on a backside of the piece of tape is in contact with the unitary body and with the length-wise first portions of the optical fibers held in the grooves.

3. The assembly of claim 2, further comprising:
a second adhesive material in contact with at least the length-wise first portions of the optical fibers held in the grooves and the unitary body, wherein the second adhesive material is cured such that the cured second adhesive material fixedly secures the length-wise first portions of the optical fibers in the respective grooves.

4. The assembly of claim 3, wherein the unitary body of the cleave holder is a molded plastic part.

5. The assembly of claim 1, wherein the connector module is a multi-optical fiber connector module comprising:
a module housing having a cavity formed therein for holding the cleaved ends of the optical fibers, the cavity having a plurality of V-shaped grooves formed in a lower surface of the cavity, each V-shaped groove being adapted for holding the unjacketed portion of each optical fiber; and
a connector module cover comprising an unfilled plastic molded part having a plurality of deformable features disposed on a lower surface thereof, wherein the connector module cover has a shape that is adapted to fit within the cavity such that the deformable features come into contact with the unjacketed portions of the optical fibers disposed within the cavity, and wherein when the connector module cover is positioned within the cavity, the deformable features permanently deform about the respective unjacketed portions of the optical fibers at locations where the deformable features come into contact with the unjacketed portions such that the unjacketed portions are precisely located between the permanently deformed features and the respective V-shaped grooves.

6. The assembly of claim 1, wherein the plurality of reference holes formed in a lower surface of the unitary body of the cleave holder are shaped, sized and positioned to receive respective pins that are disposed on a part that is external to the assembly to allow the cleave holder to be mounted on the external part to operate as the strain relief device for the optical fibers held by the connector module.

7. The assembly of claim 1, wherein the connector module comprises:
a module housing having a cavity formed therein for holding the cleaved ends of the optical fibers, the module housing including a front side from which extend at least one fine alignment feature and a back side configured with at least one tapered snap feature.

8. A cleave holder comprising:
a unitary body and a cover, the unitary body having a plurality of grooves formed in an upper surface thereof and having a plurality of reference holes formed in a lower surface thereof, the grooves holding length-wise first jacketed portions of respective optical fibers, the optical fibers also having second jacketed portions that extend from a rear side of the cleave holder and third portions that extend from a front side of the cleave holder, the cover comprising a piece of adhesive-backed tape being permanently affixed to the unitary body such that a first adhesive material disposed on a backside of the piece of tape is in contact with the unitary body and with the length-wise first portions of the optical fibers held in the grooves, the adhesive-backed tape cover serving to hold the length-wise first portions of the optical fibers in fixed positions within the cleave holder so that a part of the third portions of the optical fibers extending from the front side of the cleave holder can be stripped and cleaved creating unjacketed portions of the optical fibers with cleaved ends, wherein the unitary body and cover are configured to operate as a strain relief device for the optical fibers after they are inserted into a connector module.

9. The cleave holder of claim 8, further comprising:
a second adhesive material in contact with at least the length-wise first portions of the optical fibers held in the grooves and the unitary body, wherein the second adhesive material is cured such that the cured second adhesive material fixedly secures the length-wise first portions of the optical fibers in the respective grooves.

10. The cleave holder of claim 9, wherein the unitary body is a molded plastic part.

11. The cleave holder of claim 8, wherein the plurality of reference holes formed in a lower surface of the unitary body are shaped, sized and positioned to receive respective pins that are disposed on a part that is external to the cleave holder to allow the unitary body to be mounted on the external part to operate as the strain relief device for the optical fibers after the optical fibers are inserted into the connector module.

12. A method of securing cleaved ends of a plurality of optical fibers to a connector module comprising:
providing a cleave holder comprising a unitary body and a cover, the unitary body having a plurality of grooves formed in an upper surface thereof and having a plurality of reference holes formed in a lower surface thereof;
mounting the unitary body on a fixture such that the reference holes formed in the unitary body mate with respective pins disposed on the fixture;
disposing optical fibers on the cleave holder such that a first portion of the optical fibers extends from a rear side of the cleave holder, length-wise second portions of respective optical fibers are disposed in the grooves, and third portions of the optical fibers extend from a front side of the cleave holder;
securing the cover to the unitary body such that a backside of the cover is in contact with the unitary body and with the length-wise portions of the optical fibers disposed in the grooves, and wherein the cover serves to permanently affix the length-wise second portions of the optical fibers in fixed positions within the cleave holder;
stripping and cleaving at least a part of the third portions of the optical fibers extending from the front side of the cleave holder to create unjacketed portions of the optical fibers with cleaved ends;
providing a connector module positioned apart from the cleave holder; and
securing the cleaved ends of the optical fibers to fixed, precise locations within the connector module, wherein the cleave holder is configured to operate as a strain relief device for the optical fibers secured within the connector module.

13. The method of claim 12, wherein the cover of the cleave holder is a piece of adhesive-backed tape, the piece of adhesive-backed tape being disposed on the unitary body such that a first adhesive material disposed on a backside of the piece of tape is in contact with the unitary body and with the length-wise second portions of the optical fibers held in the grooves.

14. The method of claim 13, further comprising:
prior to securing the cleaved ends of the optical fibers to fixed, precise locations within the connector module, dispensing a second adhesive material into the cleave holder such that the second adhesive material is in contact with at least the length-wise second portions of the optical fibers held in the grooves and the unitary body, the second adhesive material being cured such that the cured second adhesive material fixedly secures the length-wise second portions of the optical fibers in the respective grooves.

15. The method of claim 14, wherein the unitary body of the cleave holder is a molded plastic part.

16. The method of claim 12, wherein the connector module is a multi-optical fiber connector module comprising:
a module housing having a cavity formed therein for holding the cleaved ends of the optical fibers, the cavity having a plurality of V-shaped grooves formed in a lower surface of the cavity, each V-shaped groove being adapted for holding the unjacketed portion of an optical fiber; and
a module cover comprising an unfilled plastic molded part having a plurality of deformable features disposed on a lower surface thereof, wherein the module cover has a shape that is adapted to fit within the cavity such that the deformable features come into contact with the unjacketed portions of optical fibers disposed within the cavity, and wherein when the module cover is positioned within the cavity, the deformable features permanently deform about the respective unjacketed portions of the optical fibers at locations where the deformable features come into contact with the unjacketed portions such that the unjacketed portions are precisely located between the permanently deformed features and the respective V-shaped grooves.

17. The method of claim 12, further comprising:
dismounting the unitary body from the fixture.

18. A method for holding a plurality of optical fibers to be stripped and cleaved comprising:
providing a cleave holder comprising a unitary body and a cover comprising a piece of adhesive-backed tape, the unitary body having a plurality of grooves formed in an upper surface thereof and having a plurality of reference holes formed in a lower surface thereof;
mounting the unitary body on a fixture such that the reference holes formed in the unitary body mate with respective pins disposed on the fixture;
disposing optical fibers on the cleave holder such that a first portion of the optical fibers extends from a rear side of the cleave holder, length-wise second portions of respective optical fibers are disposed in the grooves, and third portions of the optical fibers extend from a front side of the cleave holder;
securing the adhesive-backed tape cover to the unitary body such that a first adhesive material disposed on a backside of the piece of tape is in contact with the unitary body and with the length-wise second portions of the optical fibers disposed in the grooves, wherein the adhesive-backed tape cover permanently affixes the length-wise second portions of the optical fibers in fixed positions within the cleave holder; and
stripping and cleaving at least a part of the third portions of the optical fibers extending from the front side of the cleave holder to create unjacketed portions of the optical fibers with cleaved ends, wherein the cleave holder is configured to operate as a strain relief device for the optical fibers after the stripping and cleaving.

19. The method of claim 18, further comprising:
dispensing a second adhesive material into the cleave holder such that the second adhesive material is in contact with at least the length-wise second portions of the optical fibers held in the grooves and the unitary body, the second adhesive material being cured such that the cured second adhesive material fixedly secures the length-wise second portions of the optical fibers in the respective grooves.

20. The method of claim 18, wherein the unitary body of the cleave holder is a molded plastic part.

* * * * *